US012710687B2

(12) United States Patent
Kim et al.

(10) Patent No.: US 12,710,687 B2
(45) Date of Patent: Aug. 18, 2026

(54) ELECTRONIC DEVICE AND IMAGE MAPPING METHOD

(71) Applicant: Samsung Electronics Co., Ltd., Suwon-si (KR)

(72) Inventors: Yejin Kim, Suwon-si (KR); Pius Lee, Suwon-si (KR); Chaebin Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 266 days.

(21) Appl. No.: 18/437,741

(22) Filed: Feb. 9, 2024

(65) Prior Publication Data

US 2024/0346742 A1 Oct. 17, 2024

Related U.S. Application Data

(63) Continuation of application No. PCT/KR2024/000332, filed on Jan. 8, 2024.

(30) Foreign Application Priority Data

Apr. 12, 2023 (KR) ........................ 10-2023-0048324

(51) Int. Cl.
*G06T 15/10* (2011.01)
*G03B 21/14* (2006.01)
(Continued)

(52) U.S. Cl.
CPC .............. *G06T 15/10* (2013.01); *G03B 21/14* (2013.01); *G06T 19/006* (2013.01); *G06T 19/20* (2013.01);
(Continued)

(58) Field of Classification Search
CPC ....... G06T 15/10; G06T 19/006; G06T 19/20; G06T 2200/04; G06T 2207/10028;
(Continued)

(56) References Cited

U.S. PATENT DOCUMENTS 9,430,865 B2 8/2016 Kim
10,161,745 B2 12/2018 Fuchikami
(Continued)

FOREIGN PATENT DOCUMENTS

JP 2010191243 A 9/2010
JP 2017-169160 9/2017
(Continued)

OTHER PUBLICATIONS

Search Report and Written Opinion dated Apr. 3, 2024 issued in International Patent Application No. PCT/KR2024/000332.
(Continued)

*Primary Examiner* — Jitesh Patel
(74) *Attorney, Agent, or Firm* — Nixon & Vanderhye P.C.

(57) ABSTRACT

An electronic device according to an embodiment of the disclosure may be configured to: obtain a raster image including one or more real objects using one or more cameras, generate a vector image by vectorizing the raster image, generate an edit screen by superposing the vector image and the raster image, display a user interface representation including the edit screen on a display, generate a projection screen in response to one or more inputs to the user interface representation, and transmit the projection screen to an external electronic device connected to the electronic device.

18 Claims, 21 Drawing Sheets

(51) Int. Cl.
*G06T 19/00* (2011.01)
*G06T 19/20* (2011.01)

(52) U.S. Cl.
CPC *G06T 2200/04* (2013.01); *G06T 2207/10028* (2013.01)

(58) Field of Classification Search
CPC ........ G06T 11/60; G03B 21/14; H04N 5/272; H04N 9/31; H04N 13/156; H04N 13/271; H04N 21/41; H04N 21/436; H04N 23/60; H04N 9/3179; H04N 21/4122; H04N 21/43615
See application file for complete search history.

(56) References Cited

U.S. PATENT DOCUMENTS

| | | | | |
|---|---|---|---|---|
| 10,297,179 | B2 | 5/2019 | Doi | |
| 11,082,379 | B2 | 8/2021 | Ahn | |
| 11,131,911 | B2 | 9/2021 | Ichieda | |
| 2012/0320092 | A1 | 12/2012 | Shin et al. | |
| 2017/0200313 | A1 | 7/2017 | Lee et al. | |
| 2017/0351415 | A1 | 12/2017 | Cheng | |
| 2018/0232863 | A1 | 8/2018 | Winnemoeller et al. | |
| 2019/0371009 | A1* | 12/2019 | Peterson | G06T 11/203 |
| 2020/0344517 | A1* | 10/2020 | Park | H04N 21/44224 |
| 2021/0089674 | A1 | 3/2021 | Kawana | |
| 2021/0096687 | A1* | 4/2021 | Ano | G06F 3/0418 |
| 2021/0109428 | A1 | 4/2021 | Ichieda | |
| 2021/0306605 | A1 | 9/2021 | Ichieda et al. | |
| 2022/0108505 | A1* | 4/2022 | Dhanuka | G06T 7/136 |
| 2023/0162413 | A1* | 5/2023 | Batra | G06T 7/30 345/441 |
| 2023/0262204 | A1* | 8/2023 | Kitabayashi | H04N 9/3179 348/333.03 |
| 2024/0231577 | A1* | 7/2024 | Kim | G06F 3/0482 |

FOREIGN PATENT DOCUMENTS

| | | | |
|---|---|---|---|
| JP | 2018-160803 | | 10/2018 |
| JP | 2018160803 | A | 10/2018 |
| JP | 6601790 | B2 | 10/2019 |
| JP | 2020-013196 | | 1/2020 |
| JP | 6711284 | B2 | 6/2020 |
| JP | 2020113102 | A | 7/2020 |
| JP | 2021170146 | A | 10/2021 |
| KR | 10-2012-0138187 | | 12/2012 |
| KR | 20150003027 | A | 1/2015 |
| KR | 20150081837 | A | 7/2015 |
| KR | 20160077918 | A | 7/2016 |
| KR | 10-1876419 | | 7/2018 |
| KR | 10-2013622 | | 8/2019 |
| KR | 20190135147 | A | 12/2019 |
| KR | 10-2117007 | | 6/2020 |
| KR | 102125402 | B1 | 6/2020 |
| KR | 10-2023-0045357 | | 4/2023 |
| KR | 20230045357 | A | 4/2023 |
| WO | 2018/235128 | | 12/2018 |
| WO | 2019017023 | A1 | 1/2019 |
| WO | 2023286321 | A1 | 1/2023 |

OTHER PUBLICATIONS

Extended European Search Report dated Feb. 16, 2026, issued in counterpart European Patent Application No. 24788864.7.

Fabrice Matulic et al: "Smart Ubiquitous Projection", Human Factors in Computing Systems, ACM, 2 Penn Plaza, Suite 701 New York NY 10121-0701 USA, May 7, 2016 (May 7, 2016).

* cited by examiner

PDS

PROJECTOR OUTPUT SCREEN

RO(RO1) SBS RO(RO2)

ELECTRONIC DEVICE AND IMAGE MAPPING METHOD

CROSS-REFERENCE TO RELATED APPLICATIONS

This application is a continuation application of International Application No. PCT/KR2024/000332 designating the United States, filed on Jan. 8, 2024, in the Korean Intellectual Property Receiving Office, claiming priority to Korean Patent Application No. 10-2023-0048324, filed on Apr. 12, 2023, in the Korean Intellectual Property Office, the disclosures of each of which are hereby incorporated by reference herein in their entireties.

BACKGROUND

Field

The disclosure relates to an electronic device and an image mapping method.

Description of Related Art

Projectors have been evolving into devices with high resolution, high brightness, compact size, and/or various functions. Projectors are implemented in various types, such as laser projectors, light emitting diode (LED) projectors, and liquid crystal display (LCD) projectors. Meanwhile, projectors may be integrated with augmented reality (AR) technology. Projectors may implement environment-adapted projection results by mapping real-world real objects, positioned in the projection area, and virtual objects, as well as simply projecting images.

SUMMARY

Embodiments of the disclosure provide an electronic device and an image mapping method, capable of automatically specifying an area (mapping area) where an image is mapped among one or more objects positioned in a real environment.

Embodiments of the disclosure provide an electronic device and an image mapping method, capable of dividing mapping areas on a per-layer basis, synthesizing images respectively mapped to the divided mapping areas into a single image, and projecting the single image.

An electronic device according to an example embodiment of the disclosure may comprise: a display; a transceiver; one or more memories; and at least one processor, comprising processing circuitry, electrically connected to the display, the transceiver and the one or more memories. At least one processor, individually and/or collectively, may be configured to: obtain a captured image for one or more real objects using one or more cameras, identify a projection area included as at least part of the captured image based on feature information included in the captured image, obtain a first image corresponding to the projection area from the captured image, generate a second image by vectorizing the first image, generate an edit screen by superposing the second image and the first image, control the display to display a user interface representation including the edit screen, generate a projection screen in response to one or more inputs to the user interface representation, and control the transceiver to transmit the projection screen to an external electronic device connected to the electronic device.

According to an example embodiment, the first image may include a raster image including one or more captured objects corresponding to the one or more real objects, and the second image may include a vector image including one or more vector objects corresponding to the one or more captured objects.

According to an example embodiment, the one or more vector objects may include one or more vector lines or one or more vector planes.

According to an example embodiment, at least one processor, individually and/or collectively, may be configured to: process the one or more vector objects as one or more content mapping areas and generate one or more content layers to which content is mapped in the one or more content mapping areas in response to one or more inputs. The projection screen may include the generated one or more content layers.

According to an example embodiment, the projection screen may be generated by superposing the one or more content layers.

According to an example embodiment, the user interface representation may include a drawing area and a content selection area. The edit screen may be displayed in the drawing area, and content options mappable to a content mapping area are displayed in the content selection area.

According to an example embodiment, at least one processor, individually and/or collectively, may be configured to generate a content layer where content associated with at least one of the content options is mapped to the content mapping area in response to receiving an input for mapping the content in the content mapping area.

According to an example embodiment, at least one processor, individually and/or collectively may be configured to generate the content layer whenever receiving the input for mapping the content associated with at least one of the content options in the content mapping area.

According to an example embodiment, at least one processor, individually and/or collectively, may be configured to: generate a new projection screen by adding the generated content layer to a pre-generated projection screen and control the transceiver to transmit the new projection screen to the external electronic device in response to the generation of the new projection screen.

According to an example embodiment, at least one processor, individually and/or collectively, may be configured to control the transceiver to transmit a message for controlling the external electronic device to output a standby screen. The first image may include a raster image including a captured image for the one or more real objects where the standby screen is projected.

According to an example embodiment, the standby screen may include a stripe-pattern screen.

According to an example embodiment, at least one processor, individually and/or collectively, may be configured to: obtain three-dimensional (3D) depth information based on a stripe pattern represented in the captured image, detect a 3D vector object based on the 3D depth information, and process the 3D vector object as a content mapping area.

According to an example embodiment, an entire frame of the projection screen may be configured by synthesizing respective frames of one or more content layers of the projection screen. The entire frame of the projection screen may be reproduced based on the respective frames of the one or more content layers.

An electronic device according to an example embodiment of the disclosure may comprise: a display; one or more image projectors; one or more memories; and at least one processor, comprising processing circuitry, electrically connected to the display, the one or more image projectors and the one or more memories. At least one processor, individually and/or collectively, may be configured to: obtain a captured image for one or more real objects using one or more cameras, identify a projection area included as at least part of the captured image based on feature information included in the captured image, obtain a first image corresponding to the projection area from the captured image, generate a second image by vectorizing the first image, generate an edit screen by superposing the second image and the first image, control the display to display a user interface representation including the edit screen, generate a projection screen in response to one or more inputs to the user interface representation, and project the projection screen through the one or more image projectors.

An image mapping method performed by an electronic device according to an example embodiment of the disclosure may comprise: obtaining a captured image for one or more real objects using one or more cameras, identifying a projection area included as at least part of the captured image based on feature information included in the captured image, obtaining a first image corresponding to the projection area from the captured image, generating a second image by vectorizing the first image, generating an edit screen by superposing the second image and the first image, displaying a user interface representation including the edit screen on a display, generating a projection screen in response to one or more inputs to the user interface representation, and transmitting the projection screen to an external electronic device connected to the electronic device.

According to an example embodiment, the first image may include a raster image including one or more captured objects corresponding to the one or more real objects, and the second image may include a vector image including one or more vector objects corresponding to the one or more captured objects.

According to an example embodiment, the one or more vector objects may include one or more vector lines or one or more vector planes.

According to an example embodiment, the image mapping method may further comprise processing the one or more vector objects as one or more content mapping areas, and generating one or more content layers to which content is mapped in the one or more content mapping areas in response to one or more inputs. The projection screen may include the generated one or more content layers.

According to an example embodiment, the projection screen may be generated by superposing the one or more content layers.

According to an example embodiment, the user interface representation may include a drawing area and a content selection area. The edit screen may be displayed in the drawing area, and content options mappable to a content mapping area are displayed in the content selection area.

BRIEF DESCRIPTION OF THE DRAWINGS

The above and other aspects, features, and advantages of certain embodiments of the disclosure will be more apparent from the following description, taken in conjunction with the accompanying drawings, in which.

Figure 1:
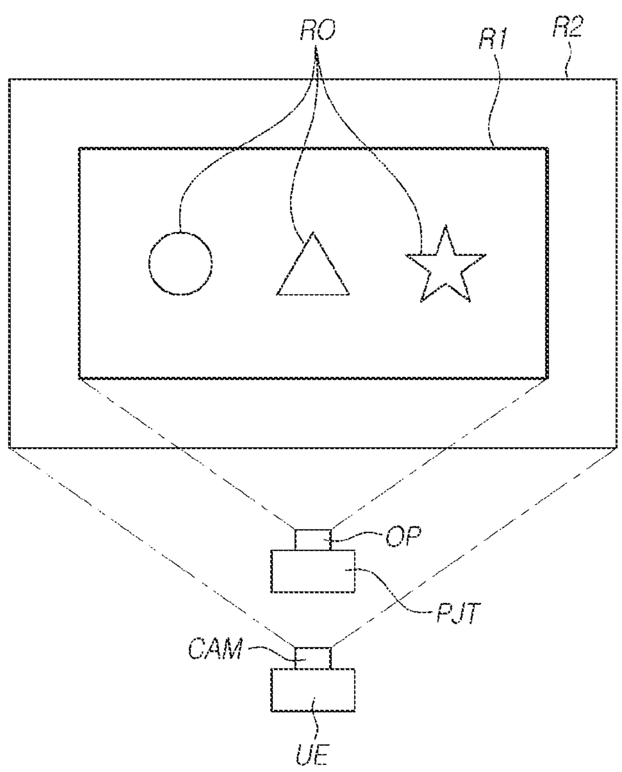
FIG. 1 is a diagram illustrating an example system according to various embodiments.

Reference may be made to the accompanying drawings in the following description, and variable examples that may be practiced are shown as examples within the drawings. Other examples may be utilized and structural changes may be made without departing from the scope of the disclosure.

DETAILED DESCRIPTION

Various example embodiments of the disclosure are now described with reference to the accompanying drawings. However, the disclosure may be implemented in other various forms and is not limited to the embodiments set forth herein. The same or similar reference denotations may be used to refer to the same or similar elements throughout the disclosure and the drawings. Further, for clarity and brevity, no description may be made of well-known functions and configurations in the drawings and relevant descriptions.

FIG. 1 is a diagram illustrating an example system according to various embodiments.

FIG. 1 illustrates a system for controlling a projector PJT using a user equipment UE. According to embodiments of the disclosure, an electronic device such as a projector PJT and a user equipment UE is provided. The user equipment UE may include various electronic devices such as a smartphone, a laptop computer, a desktop computer, or a wearable device.

Electronic devices (e.g., the projector PJT and the user equipment UE) according to embodiments of the disclosure may wiredly or wirelessly communicate with each other. The projector PJT and the user equipment UE may include one or more memories and at least one processor (including processing circuitry) electrically connected to the one or more memories, and a method according to various embodiments of the disclosure and operation(s) included in the method may be performed by the at least one processor. The method according to embodiments of the disclosure may be performed by at least one of the projector PJT or the user equipment UE. The at least one processor according to an embodiment of the disclosure may include various processing circuitry and/or multiple processors. For example, as used herein, including the claims, the term "processor" may include various processing circuitry, including at least one processor, wherein one or more of at least one processor, individually and/or collectively in a distributed manner, may be configured to perform various functions described herein. As used herein, when "a processor", "at least one processor", and "one or more processors" are described as being configured to perform numerous functions, these terms cover situations, for example and without limitation, in which one processor performs some of recited functions and another processor(s) performs other of recited functions, and also situations in which a single processor may perform all recited functions. Additionally, the at least one processor may include a combination of processors performing various of the recited/disclosed functions, e.g., in a distributed manner. At least one processor may execute program instructions to achieve or perform various functions.

In an embodiment of the disclosure, the projector PJT and/or the user equipment UE may capture various real objects of a real environment and the ambient environment in which the real objects are positioned using the camera CAM. As such, the image including various real objects and the ambient environment may be referred to as a captured image. The captured image generated or obtained by the projector PJT and/or the user equipment UE may be generated in the form of a raster image. FIG. 1 illustrates that the user equipment UE includes the camera CAM, but various embodiments of the disclosure are not limited thereto, and the projector PJT may include the camera CAM.

The projector PJT and/or the user equipment UE may generate a projection screen using a raster image obtained through the camera CAM. In an embodiment, the projection screen generated by the user equipment UE is provided to the projector PJT wiredly or wirelessly connected, and the projector PJT outputs the projection screen provided from the user equipment UE through the image projection unit OP. In an embodiment, the projection screen generated by the projector PJT is output by the projector PJT.

The captured image obtained by the camera CAM may include a projection area R1 in which the projection screen is projected by the image projection unit OP, or the projection area R1 and a peripheral area R2. The peripheral area R2 of the projection area R1 may be removed from the captured image by post-processing.

Figure 2:
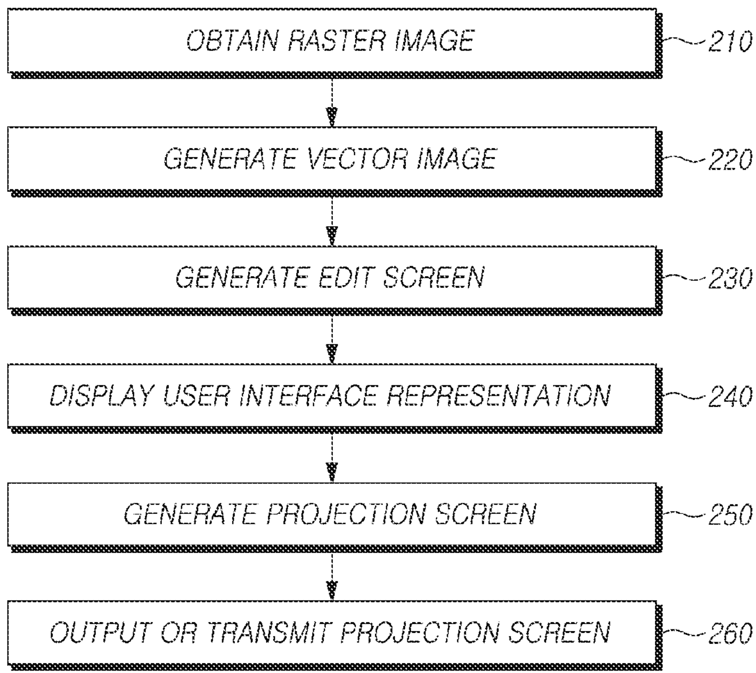
FIG. 2 is a flowchart illustrating an example image mapping method according to various embodiments.

FIG. 2 is a flowchart illustrating an example image mapping method according to various embodiments.

Each operation of FIG. 2 may be executed by one or more electronic devices. The electronic device may be either a user equipment UE or a projector PJT. Each of the following operations may be performed by one or more processing circuit units, and the processing circuit unit that performs each operation may be included in either the user equipment UE or the projector PJT.

In operation 210, the electronic device may obtain a raster image using one or more cameras.

The electronic device may obtain a raster image of a real environment using one or more cameras. Various objects may be included in the real environment. Various objects may include, e.g., a sculpture, a person, a tree, a wall, a building, or a vehicle, but are not limited thereto. In the disclosure, an object present in a real environment is referred to as a real object, and a real object captured by an electronic device is referred to as a captured object. The captured object may be included in the raster image.

In the disclosure, a raster image initially generated or obtained by a camera may be referred to as a captured image. In other words, the raster image obtained by the one or more cameras may be a captured image of a real environment in which a standby screen is projected. The electronic device may project the standby screen in one direction using the image projection unit. The standby screen may be either a white screen or a stripe-pattern screen. When the white screen is projected, two-dimensional (2D) vector objects may be detected in a subsequent operation, and when the stripe-pattern screen is projected, three-dimensional (3D) vector objects may be detected in a subsequent operation.

If the stripe-pattern screen is projected on a 3D real object, a different stripe-pattern pattern is expressed on each plane of the 3D real object. The electronic device may obtain 3D depth information using stripe-patterns expressed differently from each other. The depth information may be used for vectorization through a vectorization engine in a subsequent operation.

In operation 220, the electronic device may generate a vector image by vectorizing the raster image.

The electronic device may include a vectorization engine as at least a part thereof. The vectorization engine is a computational process that converts the raster image into a vector image including lines, curves, and other geometric shapes. The electronic device may convert the raster image into the vector image using the vectorization engine, thereby enlarging or reducing the image without loss of resolution.

The vectorization engine may be stored in at least one of the processor and/or the memory of the electronic device or configured as a circuit unit that is separate or electrically connected to the processing circuit unit. Further, the vectorization engine may not be included in the electronic device, but may be included in an external server capable of communicating with the electronic device. The vectorization engine included in the external server performs a vectorization operation according to a request of the electronic device, and responds to the electronic device with a vectorization image as a result of the vectorization.

The raster image vectorized by the vectorization engine may be a captured image obtained by one or more cameras or at least part of the captured image. In an embodiment, the electronic device may generate a vector image by vectorizing a raster image obtained by one or more cameras. In an embodiment, the electronic device may specify at least part of the captured image and generate a vector image for at least part of the captured image by vectorizing the specified at least part of the captured image.

At least part of the captured image to be vectorized may be specified based on at least one of feature information included in the captured image and/or a user input. The feature information includes at least one of a brightness difference, a visible marker, a non-visible marker, or a pattern (e.g., a stripe pattern) identified in at least a partial area of the captured image. Here, the brightness difference, the visible marker, the invisible marker, or the pattern may be output to the real environment by the standby screen used in embodiments of the disclosure. The user input is a user input for specifying at least part of the captured image, and includes a user input for adjusting the position of the edit point. The edit point is described in greater detail below with reference to FIGS. 12 and 13.

In the disclosure, at least part of the captured image to be vectorized may be referred to as an 'intermediate image' that is a basis of vectorization. The intermediate image may correspond to a projection area included as at least part of the captured image. For example, the intermediate image may be an image for the projection area included as at least part of the captured image. The electronic device may generate an intermediate image from the captured image by excluding the portion for the remaining ambient environment except for the portion for the projection area.

The intermediate image may include a primary intermediate image and a secondary intermediate image. The primary intermediate image may be generated based on feature information included in the captured image. The secondary intermediate image may be generated based on a user input to the primary intermediate image. For example, the primary intermediate image may be automatically generated by the electronic device based on feature information included in the captured image. In this case, the primary intermediate image may further include an area other than the projection area or may not include at least part of the projection area, and the electronic device may generate the secondary intermediate image based on a user input (e.g., a user input for adjusting the position of the edit point) to the primary intermediate image.

In the following description, a raster image which may be a basis for generating a vector image may be a captured image obtained by one or more cameras, or an intermediate image selected or generated from the captured image, but for convenience of description, a description will be made using the term 'raster image'.

The vectorization engine may be performed on one or more captured objects included in the raster image. The vectorization engine may convert the captured object into a vector object. The vectorization engine may generate a vector image from the raster image by converting the captured object into a vector object.

The vector object may include a line forming the outer appearance of the vector object and a plane forming the inner appearance. The line and the plane of the vector object may be referred to as a vector line and a vector plane, respectively, for convenience of description. In other words, the vector object may also include one or more vector lines and one or more vector planes.

The vector image includes one or more vector objects. The vector line is positioned along the edge of the vector plane and may include the outer appearance of the vector object. The vector line is positioned at the edge of the vector plane and may be configured to surround the outer periphery of the vector plane. A closed area surrounded by a vector line may be specified as a vector plane.

Each of the vector line and the vector plane is processed as an independent entity, and in another operation according to embodiments of the disclosure, different contents may be mapped to the vector line and the vector plane.

One or more vector planes and one or more vector lines respectively associated with the one or more vector planes may be generated corresponding to the captured object included in the raster image. The vector plane and the vector line may be related to each other. This is because the vector plane is surrounded by the vector line.

The one or more vector lines and/or vector planes may correspond to one or more captured objects included in the raster image. For example, a first vector plane may correspond to a first captured object of the raster image, and a first vector line specified along an edge of the first vector plane may correspond to an edge of the first captured object. For example, a second vector plane may correspond to a second captured object of the raster image, and a second vector line specified along an edge of the second vector plane may correspond to an edge of the second captured object.

When the 3D depth information is present, the electronic device may detect a vector object (a 3D vector object) based on the 3D depth information. Specifically, two or more planes may be included in the captured object for the 3D real object. In this case, two or more planes of one 3D captured object may be classified based on 3D depth information. Accordingly, the electronic device may vectorize one 3D captured object to generate two or more vector planes and vector line(s) associated with the two or more vector planes. Accordingly, in another operation, a different content may be mapped to each vector plane.

In operation 230, the electronic device may generate an edit screen by superposing the vector image and the raster image.

The edit screen includes a raster image and a vector image. In the edit screen, the raster image and the vector image may overlap each other. The raster image and the vector image may overlap each other to generate an edited image, and the edited image may be included as at least part of the edit screen.

The raster image and the vector image are divided as different manipulation objects and are individually manipulated, but may be expressed as overlapping on the edit screen. One or more vector lines and one or more vector planes included in the vector image may correspond to a captured object included in the raster image. Accordingly, the edit screen is configured to superimpose the raster image and the vector image to visually express the correspondence.

In operation 240, the electronic device may display a user interface representation including the edit screen on the display.

The electronic device may superpose the raster image and the vector image and display them in a portion of the user interface representation. The user interface representation includes a drawing area and a content selection area. The edit screen is displayed in the drawing area. One or more selectable contents are displayed in the content selection area. Example configurations of the drawing area and content selection area are described in greater detail below with reference to FIG. 6.

Selectable content displayed in the content selection area may be expressed as a representative image, such as a thumbnail or preview. The selectable content refers to content that the electronic device may map to at least one of a vector plane or a vector line included in the edit screen. For example, vector objects, such as vector planes or vector lines, may be processed as a content mapping area, and the selectable content may be associated with the content mapping area. The content associated with the content mapping area is selected content and may form a content layer.

In operation 250, the electronic device may generate a projection screen in response to a user input (e.g., a focusing input or a selection input) to the user interface representation.

In the edit screen, vector lines or vector planes may be processed as a content mapping area. One or more contents may be mapped to the content mapping area. Contents that may be mapped to the content mapping area may be arranged in the content selection area.

In an embodiment, the electronic device may switch the content mapping area where a focusing input is received into a focusing state based on receiving the focusing input to any one of the content mapping areas. The electronic device may map the content where a selection input is received to the content mapping area which is in a focused state, in response to receiving a selection input to the content while the content mapping area remains in the focused state.

In an embodiment, the electronic device may switch the content where a focusing input is received into the focused state based on receiving the focusing input to the content. The electronic device may map the content which is in the focused state to the content mapping area where the selection input is received in response to receiving the selection input to the content mapping area while the content remains in the focused state.

One or more contents may be mapped to the content mapping area. One or two or more contents may be mapped to one content mapping area. For example, a red plane pattern and a puppy photo together may be mapped to one vector plane, and in this case, the projection screen may be configured such that the red plane pattern and the puppy photo overlap each other on the vector plane. For example, a puppy video and a grassland background together may be mapped to one vector plane, and in this case, the projection screen may be configured such that the puppy video and the grassland background overlap each other on the vector plane.

Based on the content being mapped to at least one of the content mapping areas, the electronic device may generate a projection screen where the content is mapped to the content mapping area. In the process of generating the projection screen, a content layer may be generated in response to content being mapped to the content mapping area, and the content layer may include content mapped to the content mapping area.

The content layer may be generated whenever content is mapped to the content mapping area. For example, content layer #1 may be generated in response to content #1 being mapped to content mapping area #1, and content layer #2 may be generated in response to content #2 being mapped to content mapping area #2.

Even when the content is mapped multiple times to the same vector line or vector plane, a content layer may be generated whenever the content is mapped to the content mapping area. For example, content layer #1 may be generated in response to content #1 being mapped to a predetermined vector plane, and content layer #2 may be generated in response to content #2 being mapped to the same vector plane.

A projection screen may be generated as a plurality of content layers overlap. The projection screen may include a plurality of content layers. Each of a plurality of content layers may be generated in response to content being mapped to the content mapping area (e.g., corresponding to the vector line or vector plane). The electronic device may generate a projection screen by superposing a plurality of content layers.

In operation 260, the electronic device may directly output the generated projection screen or may transmit the projection screen to another device to output the projection screen.

In an embodiment, the electronic device (e.g., the projector PJT) may output the generated projection screen toward the real environment in which the raster image has been obtained. The captured object of the raster image is a captured image of real objects in the real environment. Accordingly, the content mapped to at least one of the vector objects corresponding to the captured object may be expressed on the real object associated with the captured object. As such, the electronic device may implement an extended reality in the real environment by expressing content using the real object as a reflector.

In an embodiment, the electronic device (e.g., the user equipment UE) may transmit the generated projection screen to the projector PJT such that the projector PJT outputs the generated projection screen. The projector PJT receiving the projection screen may output it toward the real environment where the raster image has been obtained. The content mapped to at least one of the vector objects corresponding to the captured object may be expressed on the real object associated with the captured object. As such, the electronic device may implement an extended reality in the real environment by expressing content using the real object as a reflector.

As such, according to various embodiments of the disclosure, the electronic device may obtain a captured image including objects (captured objects) through a camera and divide the captured objects into vector planes or vector lines where content may automatically be mapped. Further, the electronic device may edit contents on a per-layer basis by generating a new content layer whenever mapping content to an automatically divided vector plane or vector line. Further, the electronic device may identify, in real time, how the projection result (projector output screen) is expressed in the real environment by superposing and displaying content layers to generate a projection screen and projecting, in real time, the generated projection screen.

Figure 3:
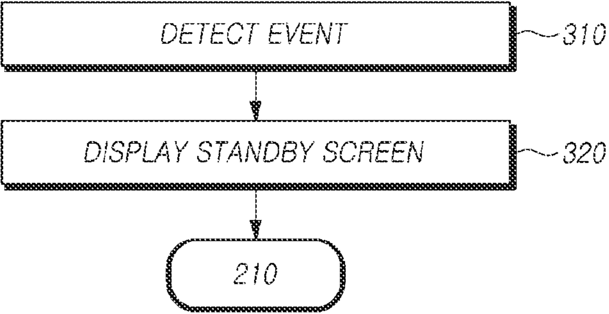
FIG. 3 is a flowchart illustrating an example image mapping method according to various embodiments.

FIG. 3 is a flowchart illustrating an example image mapping method according to various embodiments.

Referring to FIG. 3, the electronic device may be either a user equipment UE or a projector PJT. Each of the following operations may be performed by one or more processing circuit units, and the processing circuit unit that performs each operation may be included in either the user equipment UE or the projector PJT.

Referring to FIG. 3, an image mapping method according to various embodiments of the disclosure may include operations 310 and 320. Operation 320 may be performed before operation 210 described with reference to FIG. 2, and operations subsequent to operation 210 may not be repeated here.

Referring to FIG. 3, in operation 310, the electronic device may detect an event.

The event may be preset by the user. The event may include, e.g., an event in which the electronic device is connected to another electronic device or an event in which an initiation command is received through an application. For example, the event may include an event in which the electronic device (e.g., user equipment UE (or projector PJT)) is wiredly or wirelessly connected to another electronic device (e.g., projector PJT (or user equipment UE)) or an event in which an image mapping application including commands for executing image mapping operations according to various embodiments of the disclosure is executed.

In operation 320, the electronic device may output (e.g., display) a standby screen in response to detection of an event. For example, the electronic device may transmit a command to allow another electronic device to output the standby screen, or may transmit the standby screen to another electronic device. For example, the electronic device may directly project the standby screen.

The standby screen may include a white screen and a stripe-pattern screen. The white screen is a white-only screen. The stripe-pattern screen is a screen that includes a stripe pattern. When the stripe-pattern screen is reflected on a real object, the size or interval between stripe patterns varies depending on the depth, and the depth of the real object may be determined depending on the difference in size or interval between stripe patterns.

The electronic device may selectively output either the white screen or the stripe-pattern screen based on a user input. For example, the electronic device may output a white screen to detect a 2D vector object and may output a stripe-pattern screen to detect a 3D vector object. The electronic device may output a white screen in response to receiving a first user input and output a stripe-pattern screen in response to receiving a second user input. The first user input and/or the second user input may be received directly through an input unit provided in the electronic device or received, in the form of an electrical signal or a message, from another electronic device.

Thereafter, the electronic device may obtain a raster image for real objects where the standby screen is projected as in operation 210. For example, a captured image of a real object where the standby screen is projected may be obtained through the camera. The raster image may be substantially the same as the captured image or may be configured as at least part of the captured image selected by a user input.

As such, the electronic device may detect the properties (e.g., position or shape) of the real object to be mapped to the vector object before outputting a projection screen including content by adding the operation of projecting the standby screen before obtaining the raster image. Further, the electronic device may provide the user with a projector output result adaptive to the real environment by mapping content to the vector object generated to fit the real object according to the detection result.

Figure 4:
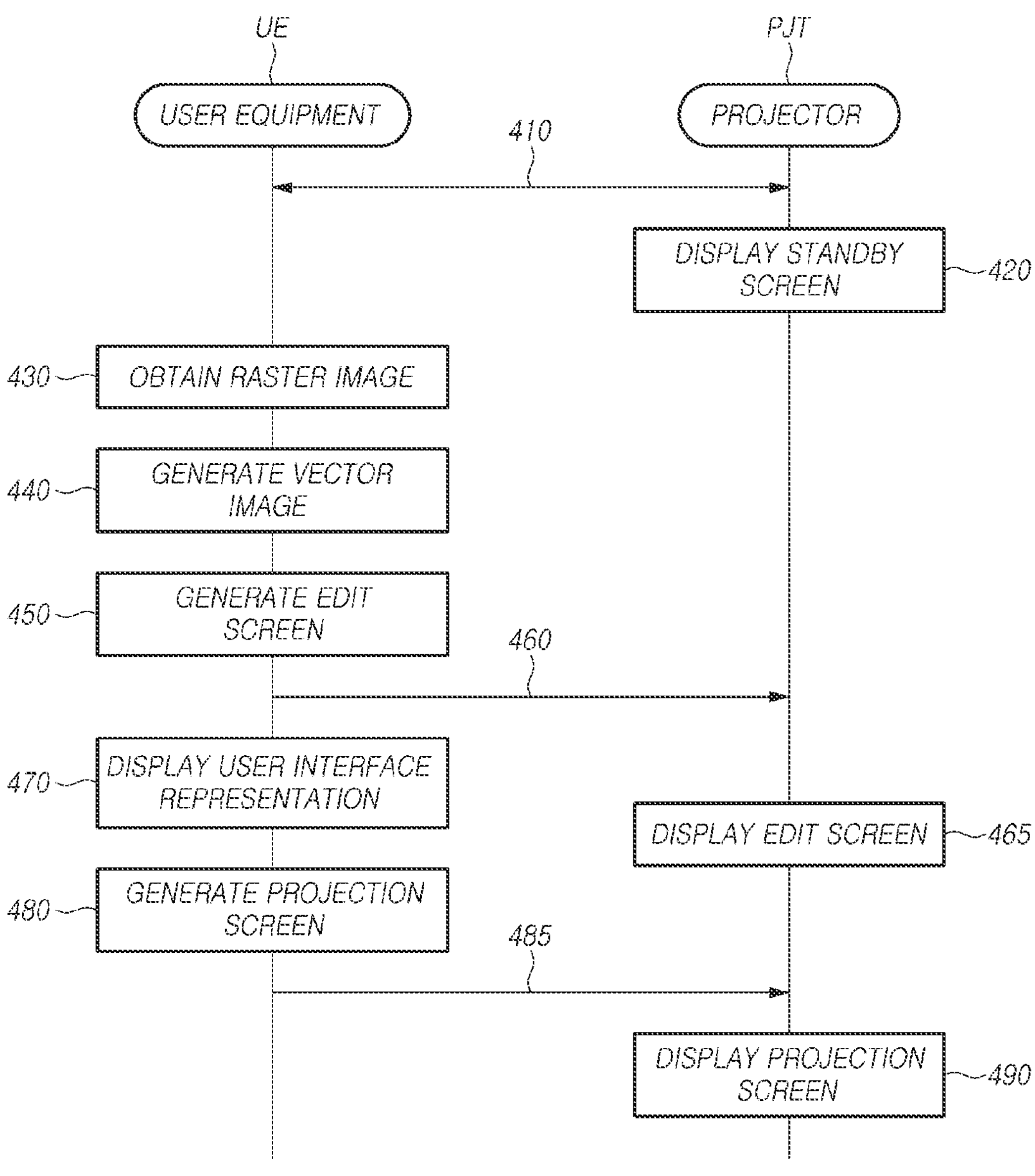
FIG. 4 is a signal flow diagram illustrating an example image mapping method according to various embodiments.

FIG. 4 is a signal flow diagram illustrating an example image mapping method according to various embodiments.

Referring to FIG. 4, a user equipment UE may correspond to the user equipment UE of FIG. 1, and a projector PJT may correspond to the projector PJT of FIG. 1. Either the user equipment UE or the projector PJT may be the electronic device described above with reference to FIGS. 2 and 3.

In operation 410, the user equipment UE may be communicatively connected to the projector PJT. For example, the user equipment UE and the projector PJT may be wiredly or wirelessly connected to each other, and while the connection is maintained, the user equipment UE and the projector PJT may transmit or receive electrical signals, messages, commands, and/or data to or from each other.

In operation 420, the projector PJT may project (e.g., display) the standby screen through the image projection unit. The standby screen may include a white screen or a standby screen. In an embodiment, the projector PJT may project the standby screen based on wired or wireless connection with the user equipment UE. In an embodiment, the projector PJT may project the standby screen in response to receiving a command instructing to project the standby screen from the user equipment UE. In an embodiment, the projector PJT may project the standby screen in response to receiving a user input to the input unit of the projector PJT.

In operation 430, the user equipment UE may obtain a raster image by capturing the real environment where the standby screen is projected through the camera. The user equipment UE may obtain a captured image of the real environment. The captured image may include the real environment where the standby screen is projected and a peripheral area around the real environment where the standby screen is projected. Here, the captured image is generated in the form of a raster image rather than a vector image.

In operation 440, the user equipment UE may generate a vector image based on the captured image. The vector image may be generated by the vectorization engine. The user equipment UE may perform vectorization on at least part of the raster image using the vectorization engine. Vectorization may be performed on the whole or part of the raster image. When performed on a portion of the raster image, the vector image may be formed to have a size corresponding to the portion. The partial area may be determined by a user input. For example, the user may select a partial area of the raster image through an input, and vectorization may be performed on the selected partial area.

The vector image may include a vector object. The vector object may include a vector line and/or a vector plane. Content may be mapped to the vector object.

In operation 450, the user equipment UE may generate an edit screen. The edit screen may include a raster image and a vector image. The vector image and the raster image may overlap each other. The vector object included in the vector image may correspond to the captured objects included in the raster image. For example, vector objects may correspond one-on-one to captured objects at positions overlapping each other.

In the edit screen, the vector object may be processed as a content mapping area. One or more contents may be mapped to the content mapping area. The edit screen may fixedly display the raster image and map the content to the content mapping area included in the vector image. Accordingly, through the edit screen, the user may identify in advance the form in which the content is expected to be displayed for the real environment.

In operation 460, the user equipment UE may transmit the edit screen to the projector PJT. The user equipment UE may transmit the edit screen to the projector PJT at least periodically or in real time.

In operation 465, the projector PJT may project the edit screen received from the user equipment UE. Accordingly, the user may identify the edit screen through the real environment projected by the projector PJT rather than the display of the user equipment UE. The user may identify with the naked eye the projection result where the vector object overlaps the real object, and thus, when there is an error in the position between the vector object and the real object, the user may directly adjust the position of the vector object.

Operations 460 and 465 may be omitted in various embodiments of the disclosure.

In operation 470, the user equipment UE may display a user interface representation on the display. The user interface representation may include a drawing area, a content selection area, or a plurality of buttons. In the drawing area, a raster image and a vector image may be displayed to overlap each other. The drawing area may include a content mapping area corresponding to the vector object.

In operation 480, the user equipment UE may generate a projection screen based on a user input (e.g., a focusing input, a selection input, or the like) to the user interface representation. The user equipment UE may map the content about the option to which a focusing input is applied to the content mapping area, based on receiving the focusing input to the options disposed in the content selection area and receiving a selection input to the content mapping area.

The user equipment UE may generate a content layer in response to mapping the content to the content mapping area. The user equipment UE may generate a content layer whenever content is mapped to the content mapping area. One content may be included in the content layer. The projection screen may be generated by superposing a plurality of content layers. The content layer may include one content, and the projection screen may include a plurality of contents as the plurality of content layers overlap each other. The plurality of contents included in the projection screen may be independently expressed, executed, or reproduced.

The user equipment UE may include interaction information between content layers in the projection screen. The interaction information includes information for interaction between contents included in the content layers. For example, the image included in the first content layer and the image included in the second content layer may be synchronized with each other and reproduced. For example, the image for the second content layer may be reproduced in response to the reproduction of the image for the first content layer being finished.

In operation 485, the user equipment UE may transmit the generated projection screen to the projector PJT. The user equipment UE may transmit the projection screen, and may transmit a command or message for controlling the projector PJT to output the received projection screen.

In operation 490, the projector PJT may display the received projection screen. Specifically, if the projection screen is received, the received projection screen may be output through the image projection unit. In response to receiving the projection screen or the command or message for controlling to output the projection screen, the projection screen may be output through the image projection unit.

Figure 5:
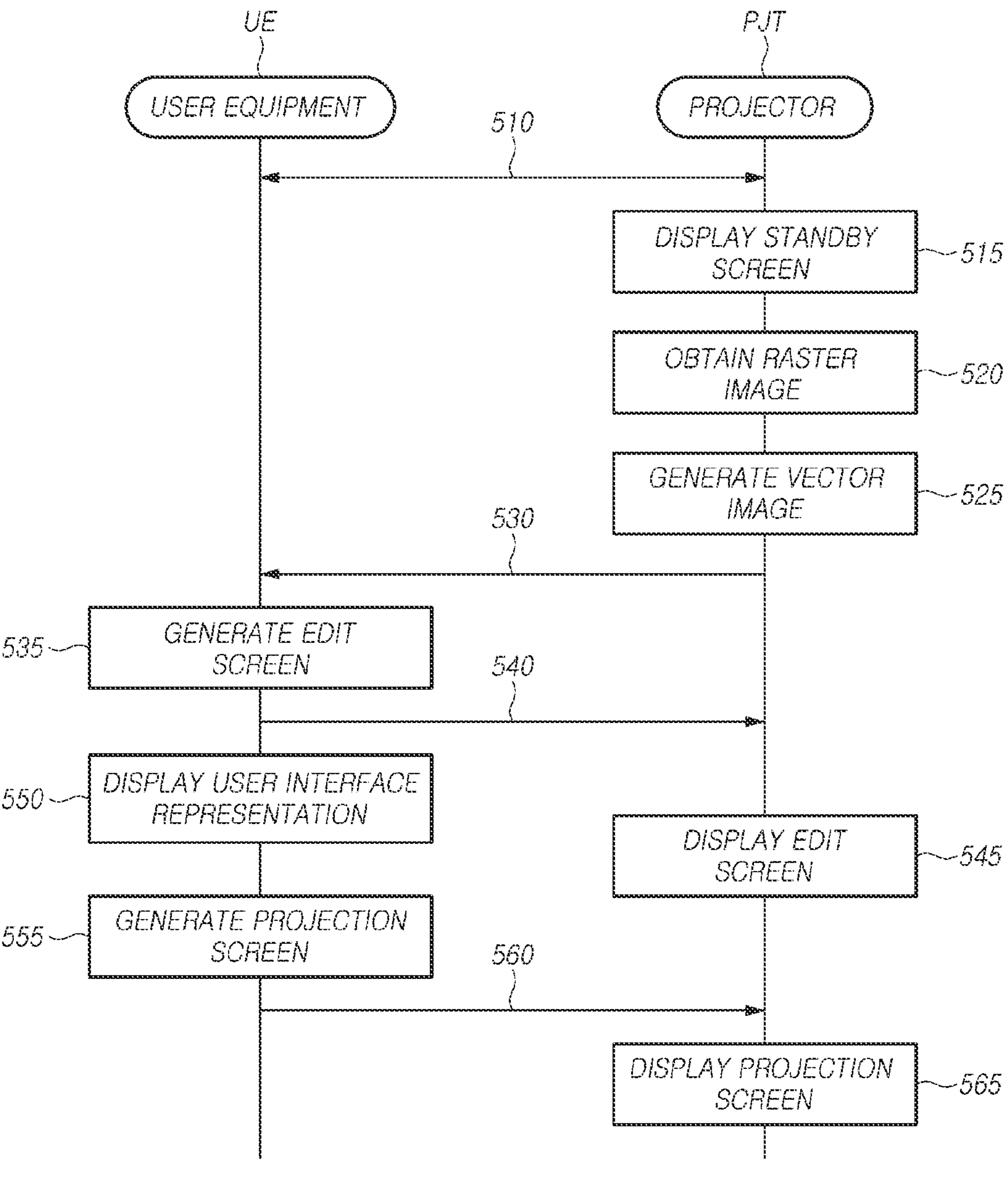
FIG. 5 is a signal flow diagram illustrating an example image mapping method according to various embodiments of the disclosure.

FIG. 5 is a signal flow diagram illustrating an example image mapping method according to various embodiments.

Referring to FIG. 5, a user equipment UE may correspond to the user equipment UE of FIG. 1, and a projector PJT may correspond to the projector PJT of FIG. 1. Either the user equipment UE or the projector PJT may be the electronic device described above with reference to FIGS. 2 and 3.

In operation 510, the user equipment UE may be communicatively connected to the projector PJT. For example, the user equipment UE and the projector PJT may be wiredly or wirelessly connected to each other, and while the connection is maintained, the user equipment UE and the projector PJT may transmit or receive electrical signals, messages, commands, and/or data to or from each other.

In operation 515, the projector PJT may project (e.g., display) the standby screen through the image projection unit. The standby screen may include a white screen or a standby screen. In an embodiment, the projector PJT may project the standby screen based on wired or wireless connection with the user equipment UE. In an embodiment, the projector PJT may project the standby screen in response to receiving a command instructing to project the standby screen from the user equipment UE. In an embodiment, the projector PJT may project the standby screen in response to receiving a user input to the input unit of the projector PJT.

In operation 520, the projector PJT may obtain a raster image by capturing the real environment where the standby screen is projected through the camera. The projector PJT may obtain a captured image of the real environment. The captured image may include the real environment where the standby screen is projected and a peripheral area around the real environment where the standby screen is projected. Here, the captured image is generated in the form of a raster image rather than a vector image.

In operation 525, the projector PJT may generate a vector image based on the captured image. The vector image may be generated by the vectorization engine. The projector PJT may perform vectorization on at least part of the raster image using the vectorization engine. Vectorization may be performed on the whole or part of the raster image. When performed on a portion of the raster image, the vector image may be formed to have a size corresponding to the portion. The partial area may be determined by a user input. Specifically, the user may select a partial area of the raster image through an input, and vectorization may be performed on the selected partial area.

The vector image may include a vector object. The vector object may include a vector line and/or a vector plane. Content may be mapped to the vector object.

In operation 530, the projector PJT may transmit at least one of the raster image and/or the vector image to the user equipment UE.

In operation 535, the user equipment UE may generate an edit screen. The edit screen may include a raster image and a vector image. The vector image and the raster image may overlap each other. In an embodiment, the user equipment UE may generate an edit screen using the vector image and the raster image received from the projector PJT. In an embodiment, the user equipment UE may generate an edit screen using the vector image received from the projector PJT and the raster image obtained through the camera provided in the user equipment UE.

The vector object included in the vector image may correspond to the captured objects included in the raster image. For example, vector objects may correspond one-on-one to captured objects at positions overlapping each other.

In the edit screen, the vector object may be processed as a content mapping area. One or more contents may be mapped to the content mapping area. The edit screen may fixedly display the raster image and map the content to the content mapping area included in the vector image. Accordingly, through the edit screen, the user may identify in advance the form in which the content is expected to be displayed for the real environment.

In operation 540, the user equipment UE may transmit the edit screen to the projector PJT. The user equipment UE may transmit the edit screen to the projector PJT at least periodically or in real time.

In operation 545, the projector PJT may project (e.g., display) the edit screen received from the user equipment UE. Accordingly, the user may identify the edit screen through the real environment projected by the projector PJT rather than the display of the user equipment UE. The user may identify with the naked eye the projection result where the vector object overlaps the real object, and thus, when there is an error in the position between the vector object and the real object, the user may directly adjust the position of the vector object.

Operations 540 and 545 may be omitted in various embodiments of the disclosure.

In operation 550, the user equipment UE may display a user interface representation on the display. The user interface representation may include a drawing area, a content selection area, or a plurality of buttons. In the drawing area, a raster image and a vector image may be displayed to overlap each other. The drawing area may include a content mapping area corresponding to the vector object.

In operation 555, the user equipment UE may generate a projection screen based on a user input (e.g., a focusing input, a selection input, or the like) to the user interface representation. The user equipment UE may map the content about the option to which a focusing input is applied to the content mapping area, based on receiving the focusing input to the options disposed in the content selection area and receiving a selection input to the content mapping area.

The user equipment UE may generate a content layer in response to mapping the content to the content mapping area. The user equipment UE may generate a content layer whenever content is mapped to the content mapping area. One content may be included in the content layer. The projection screen may be generated by superposing a plurality of content layers. The content layer may include one content, and the projection screen may include a plurality of contents as the plurality of content layers overlap each other. The plurality of contents included in the projection screen may be independently expressed, executed, or reproduced.

The user equipment UE may include interaction information between content layers in the projection screen. The interaction information includes information for interaction between contents included in the content layers. For example, the image included in the first content layer and the image included in the second content layer may be synchronized with each other and reproduced. For example, the image for the second content layer may be reproduced in response to the reproduction of the image for the first content layer being finished.

In operation 560, the user equipment UE may transmit the generated projection screen to the projector PJT. The user equipment UE may transmit the projection screen, and may transmit a command or message for controlling the projector PJT to output the received projection screen.

In operation 565, the projector PJT may display the received projection screen. Specifically, if the projection screen is received, the received projection screen may be output through the image projection unit. In response to receiving the projection screen or the command or message for controlling to output the projection screen, the projection screen may be output through the image projection unit.

Figure 6:
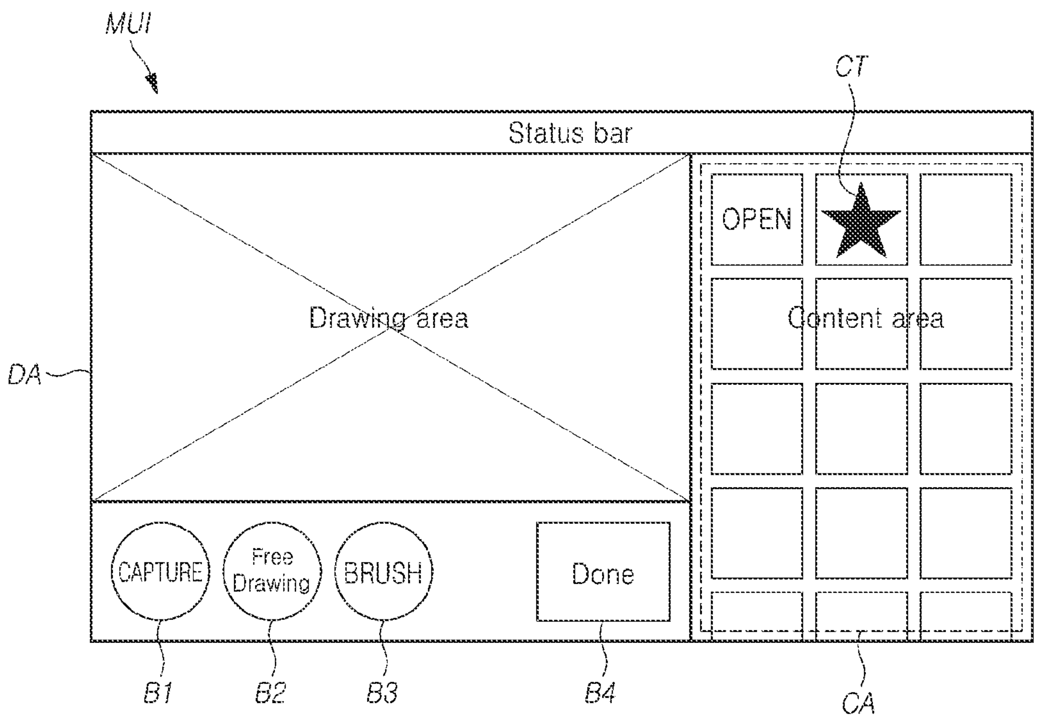
FIG. 6 is a diagram illustrating an example user interface representation according to various embodiments.
Figure 7:
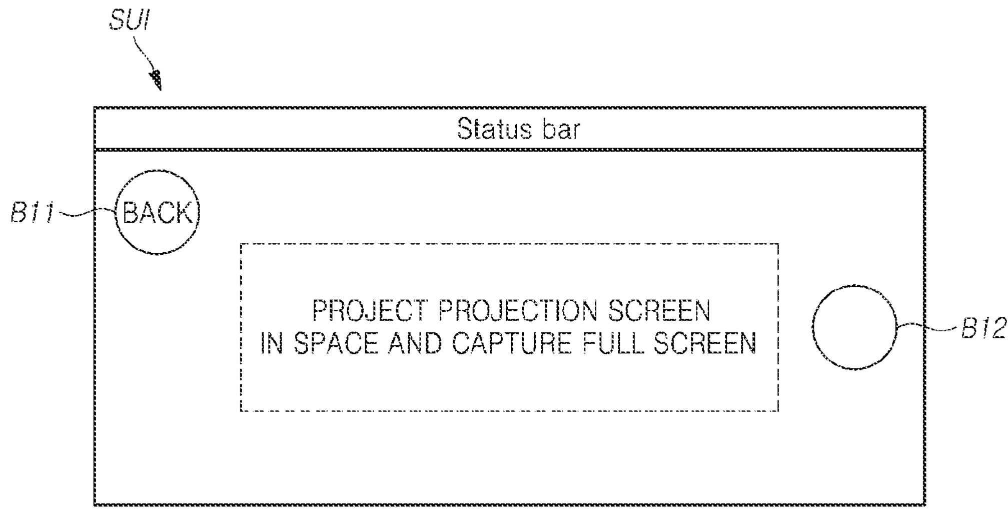
FIG. 7 is a diagram illustrating an example sub-user interface representation associated with a capture button according to various embodiments.
Figure 8:
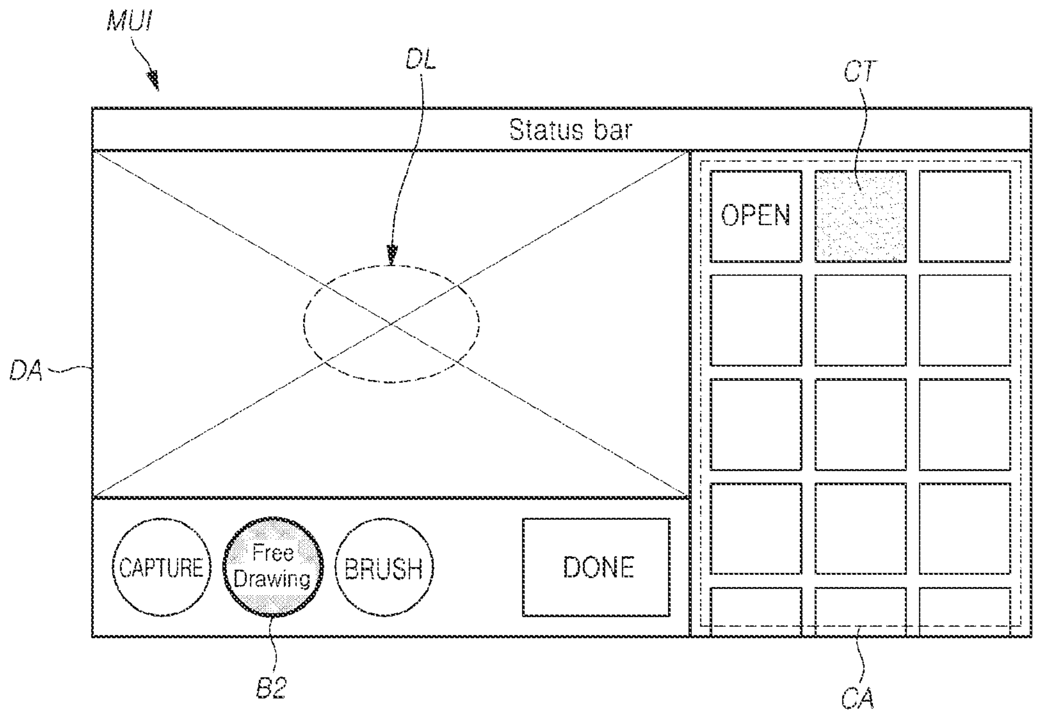
FIG. 8 is a diagram illustrating an example user interface representation associated with a free drawing button according to various embodiments.
Figure 9:
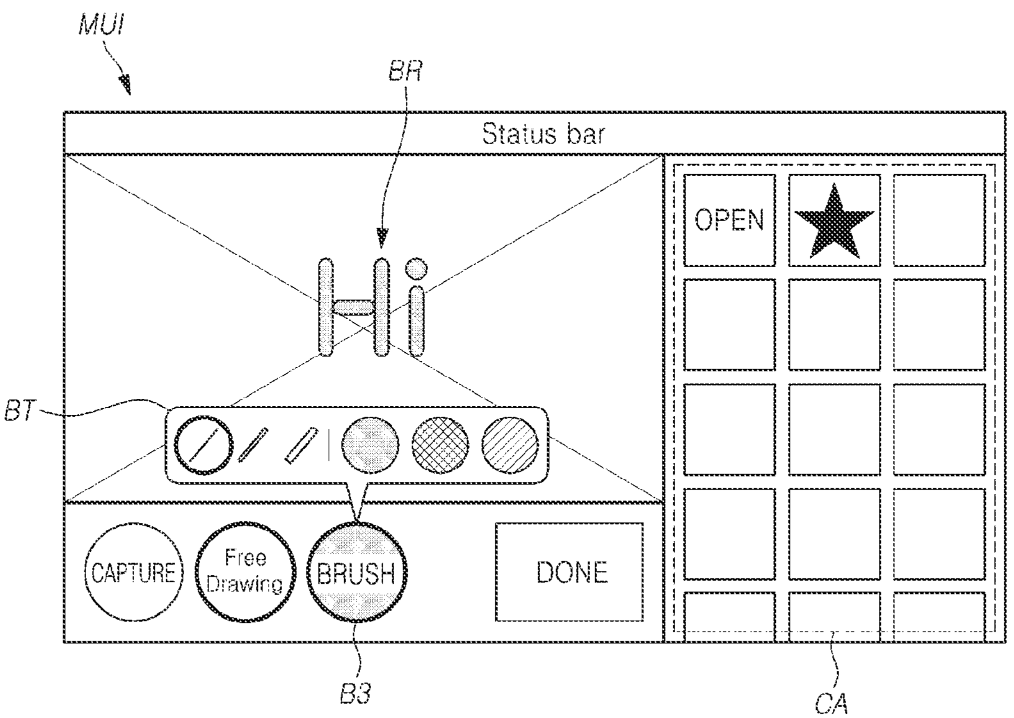
FIG. 9 is a diagram illustrating an example user interface representation associated with a brush button according to various embodiments.

FIG. 6 is a diagram illustrating an example user interface representation according to various embodiments. FIG. 7 is a diagram illustrating a sub-user interface representation associated with a capture button according to various embodiments. FIG. 8 is a diagram illustrating a user interface representation associated with a free drawing button according to various embodiments. FIG. 9 is a diagram illustrating a user interface representation associated with a brush button according to various embodiments.

Referring to FIG. 6, a user interface representation MUI may include a drawing area DA, a content selection area CA, or a plurality of buttons.

In the drawing area DA, a raster image and a vector image may be expressed to overlap each other. The aspect ratio of the drawing area DA may be substantially identical or be similar to the output ratio of the projector.

A plurality of content thumbnails (CT) may be expressed in the content selection area CA. The content thumbnails may include preview images of contents (e.g., selectable contents) that may be mapped to the content mapping area. The content thumbnail may be an “option” set to receive a user input.

The plurality of buttons include a capture button B1, a free drawing button B2, a brush button B3, and/or a done button B4. The plurality of buttons are set to be able to receive a user input. The plurality of buttons are set to execute a specific operation in response to a user input.

Referring to FIG. 6, in response to receiving a user input to the capture button B1, the electronic device may invoke a sub-user interface representation SUI. Specifically, in response to receiving a user input (e.g., a touch input) to the capture button B1, the electronic device may switch the user interface representation MUI into the sub-user interface representation SUI and display the sub-user interface representation SUI on the display. In the disclosure, the sub-user interface representation SUI may be understood as a ‘capture screen’ for obtaining a captured image through one or more cameras. The sub-user interface representation SUI may be any one of sub-user interface representations dependent on the user interface representation MUI. An example configuration of the sub-user interface representation SUI is described in greater detail below with reference to FIG. 7.

Referring to FIGS. 6 and 7, a sub-user interface representation SUI may include a first button B11 and/or a second button B12. For example, based on receiving a user input to the first button B11, the electronic device may switch the sub-user interface representation SUI into the user interface representation MUI and display the user interface representation MUI on the display. For example, based on receiving a user input to the second button B12, the electronic device may execute camera photographing or allocate the captured image obtained by the camera to the drawing area DA of the user interface representation MUI. In response to receiving a user input to the second button B12 before obtaining the captured image, the electronic device may obtain the captured image by performing camera photographing. Further, in response to receiving a user input to the second button B12 after obtaining the captured image, the electronic device may input the captured image to the drawing area DA of the user interface representation MUI.

Referring to FIGS. 6 and 8, in response to receiving a user input to the free drawing button B2, the electronic device may switch to the free drawing mode. The free drawing mode is any one of various execution modes of the electronic device.

While remaining in the free drawing mode, the electronic device may receive a user input to the drawing area DA and may generate a content mapping area based on the user input. For example, a drawing line DL corresponding to a user input (e.g., a drag input) to the drawing area DA may be generated, and a content mapping area may be specified by the drawing line DL. Content may be mapped to the content mapping area specified by the drawing line DL. The thumbnail of the content that may be mapped to the content mapping area may be expressed in the content selection area CA.

While remaining in the free drawing mode, the free drawing button B2 may be expressed in a different color. The free drawing mode may be enabled or disabled in response to a selection input to the free drawing button B2. For example, based on receiving a user input to the free drawing button B2 while the free drawing mode is maintained, the electronic device may disable the free drawing mode. For example, in response to receiving a user input to the free drawing button B2 in a state in which the free drawing mode is disabled, the electronic device may enable the free drawing mode.

Referring to FIGS. 6 and 9, in response to receiving a user input to the brush button B3, the electronic device may switch to the brush mode. The brush mode is any one of various execution modes of the electronic device.

While remaining in the brush mode, the electronic device may receive a user input to the drawing area DA and may display a brush representation BR based on the user input. For example, a brush representation BR corresponding to a user input (e.g., a drag input) to the drawing area DA may be generated, and the brush representation BR may be displayed in the drawing area DA.

While remaining in the brush mode, the electronic device may display a brush tool box BT for determining a style of the brush representation BR. The brush tool box BT may include various types of brush options. The electronic device may set the style of the brush representation BR according to a selection input to the brush option. For example, the electronic device may set the style of the brush representation BR including at least one of a thickness, a color, and/or a pattern of the brush representation BR.

Referring back to FIG. 6, e.g., in response to receiving a user input to the done button B4, the electronic device may terminate the edit screen and may control to output the editing result to the image projection unit of the electronic device or the image projection unit provided in another electronic device.

FIGS. 10, 11, 12, 13, 14, 15, and 16 are diagrams illustrating changes in a user interface representation according to an image mapping method according to various embodiments.

The mobile screen of FIGS. 10, 11, 12, 13, 14, 15, and 16 denotes a user interface representation MUI, and the projector output screen PDS denotes a result of projecting a projection screen to the real environment by the projector. The mobile screen is substantially the same as the mobile screen described above with reference to FIG. 6. Since the projector output screen PDS is one obtained by projecting the projection screen to the real environment, real objects RO (e.g., including a first real object RO1 and a second real object RO2) positioned in the real environment may be included. In the disclosure, the projector output screen PDS may be interchangeably used with "projector output result", "projector projection result", and "projected real environment".

Figure 10:
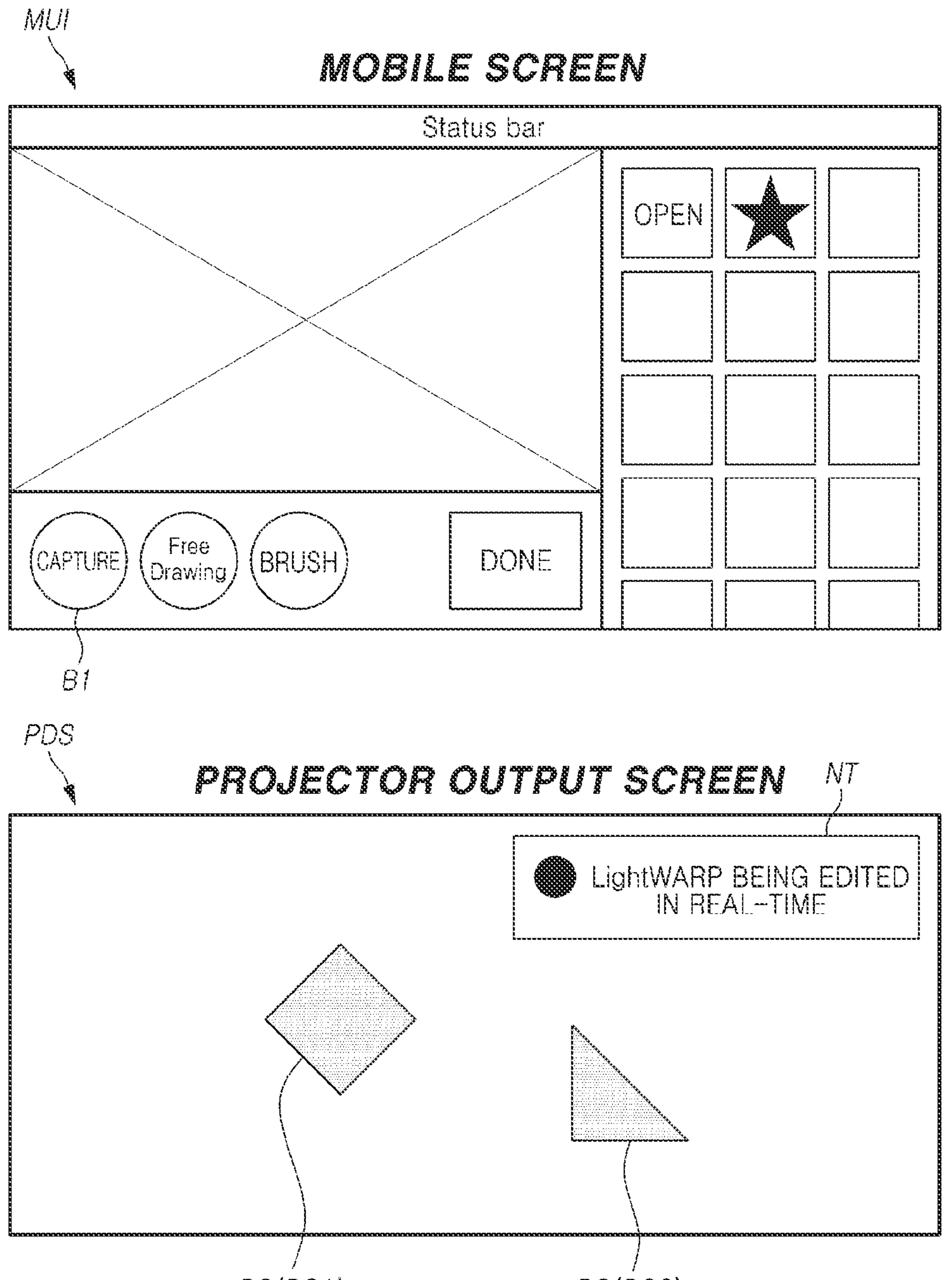
FIGS. 10, 11, 12, 13, 14, 15, and 16 are diagrams illustrating changes in a user interface representation according to an image mapping method according to various embodiments.

Referring to FIG. 10, the projector does not project the edit screen or the projection screen until the edit screen is generated.

Although not limited thereto, until the edit screen is generated, the projector may output a standby screen SBS for generating the edit screen. The standby screen SBS may be either a white screen or a stripe-pattern screen. The output standby screen SBS may be reflected by the real object RO, and the light reflected from the real object RO may be captured by the camera of the user equipment.

The projector may output an edit guide NT before the edit screen is generated. The edit guide NT may include, e.g., a text message such as "LightWARP is being edited in real time".

In response to receiving a user input to the capture button of the user interface representation MUI, the user equipment switches the user interface representation MUI into the sub-user interface representation SUI.

Figure 11:
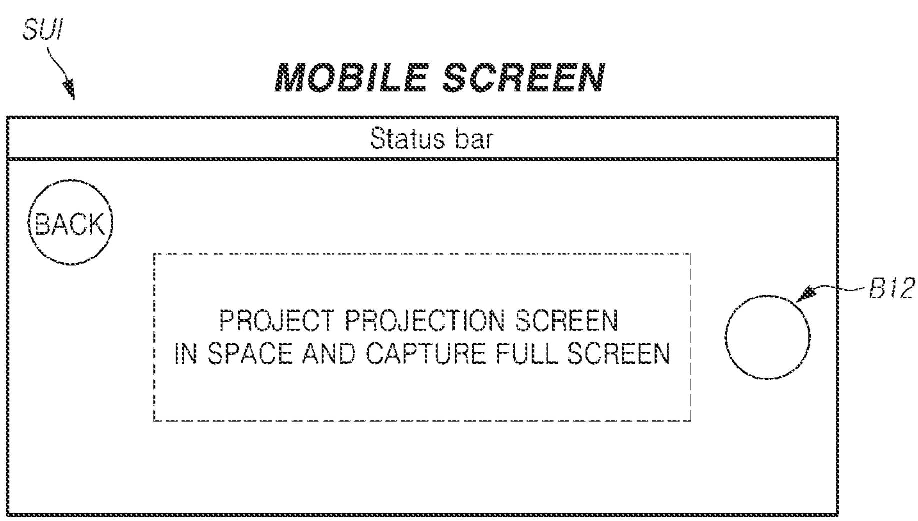
Figure 11:
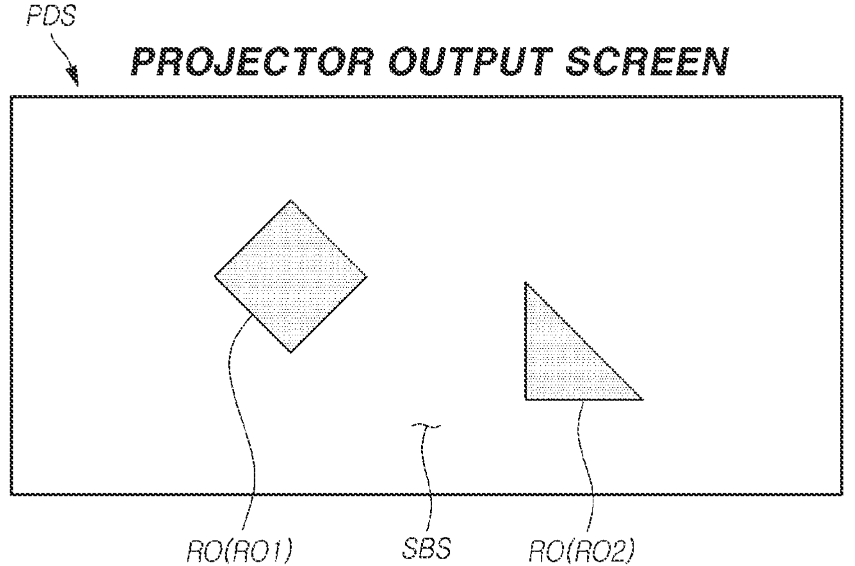

Referring to FIG. 11, while the user equipment displays the sub-user interface representation SUI, the projector does not project the projection screen. Although not limited thereto, the projector may output a standby screen SBS for generating an edit screen.

In an embodiment, the user equipment transmits a message for controlling to output the standby screen SBS to the projector in response to receiving a user input to the capture button B1. The user equipment may receive the light reflected from the real object RO where the standby screen SBS is projected through the camera, and may generate a captured image CI from the light.

The standby screen SBS may be either a white screen or a stripe-pattern screen.

In an embodiment, while the sub-user interface representation SUI is displayed, the user equipment may execute a capture operation of the camera in response to receiving a user input to the second button. Accordingly, the camera may obtain a captured image CI of the real environment corresponding to the projector output screen PDS. The captured image CI may include a real object RO. Specifically, the captured image CI may include a real object RO where the standby screen SBS is projected.

Figure 12:
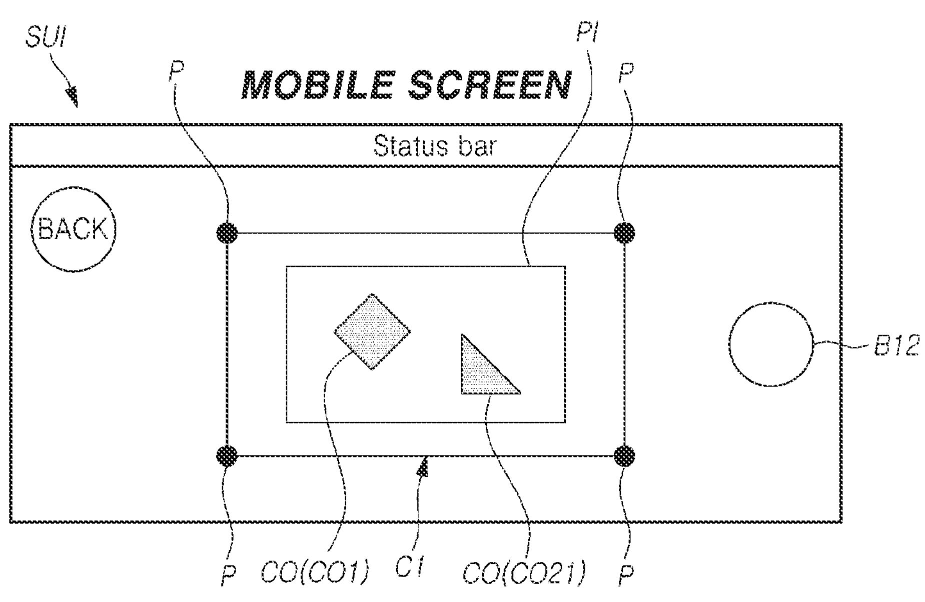

Referring to FIG. 12, based on obtaining the captured image CI, the captured image CI may be displayed as at least the portion of the sub-user interface representation SUI. The captured image CI includes a projection image PI corresponding to the projector output screen PDS. The projection image PI may include a captured object CO. The captured object CO corresponds to a real object RO. The captured object CO may have a color or pattern different from that of the real object RO. The captured object CO is a result of the standby screen SBS being projected and reflected on the real object RO, and the real object RO may differ in color expression or pattern expression. For example, the captured object CO may be expressed brighter than the real object RO. For example, unlike the real object RO, the captured object CO may have a stripe pattern.

In a state in which the captured image CI is obtained, the user equipment may provide the captured image CI as a user interface representation MUI in response to receiving a user input to the second button B12. Specifically, the user equipment may input the captured image CI to the drawing area DA of the user interface representation MUI.

An edit point P may be displayed at a vertex of the captured image CI. Based on a user input to the edit point P, the user equipment may determine an edit area. The edit area may be a polygon defined by the edit point P. Polygons may include triangles, squares, pentagons, or hexagons, but are not limited thereto.

Based on receiving a user input to the second button B12, the user equipment may associate the captured image CI included in the edit area with the drawing area DA of the user interface representation MUI.

Figure 13:
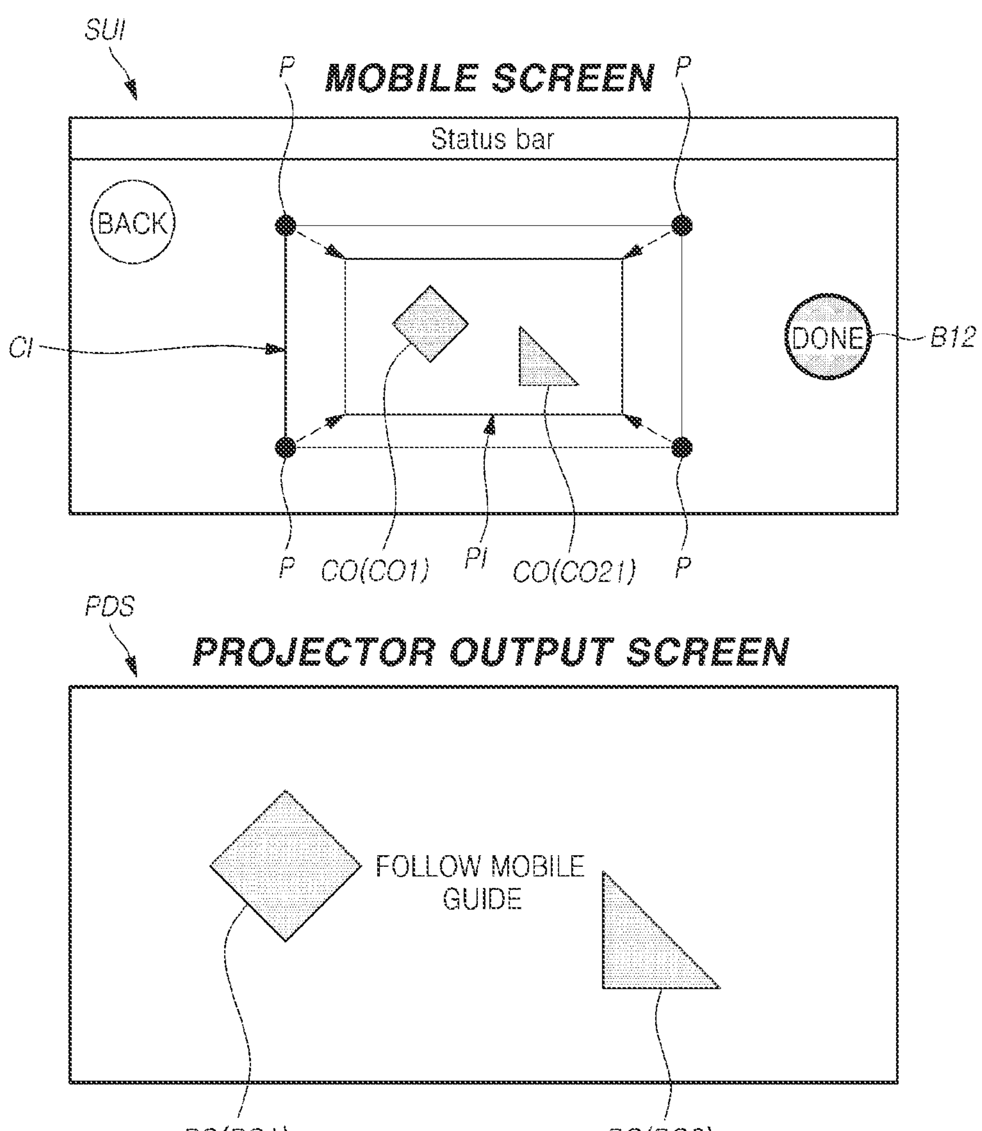

Referring to FIG. 13, the user equipment may adjust the size and/or position of the edit area based on a user input to the edit point P. For example, the position of the edit point P may be changed through a drag input to the edit point P. As the position of the edit point P is changed, at least one of the size and/or position of the edit area may be adjusted.

Based on receiving a user input to the second button B12, the user equipment may associate the image corresponding to the adjusted edit area with the drawing area DA of the user interface representation MUI. An image corresponding to the edit area may be displayed in the drawing area DA.

Figure 14:
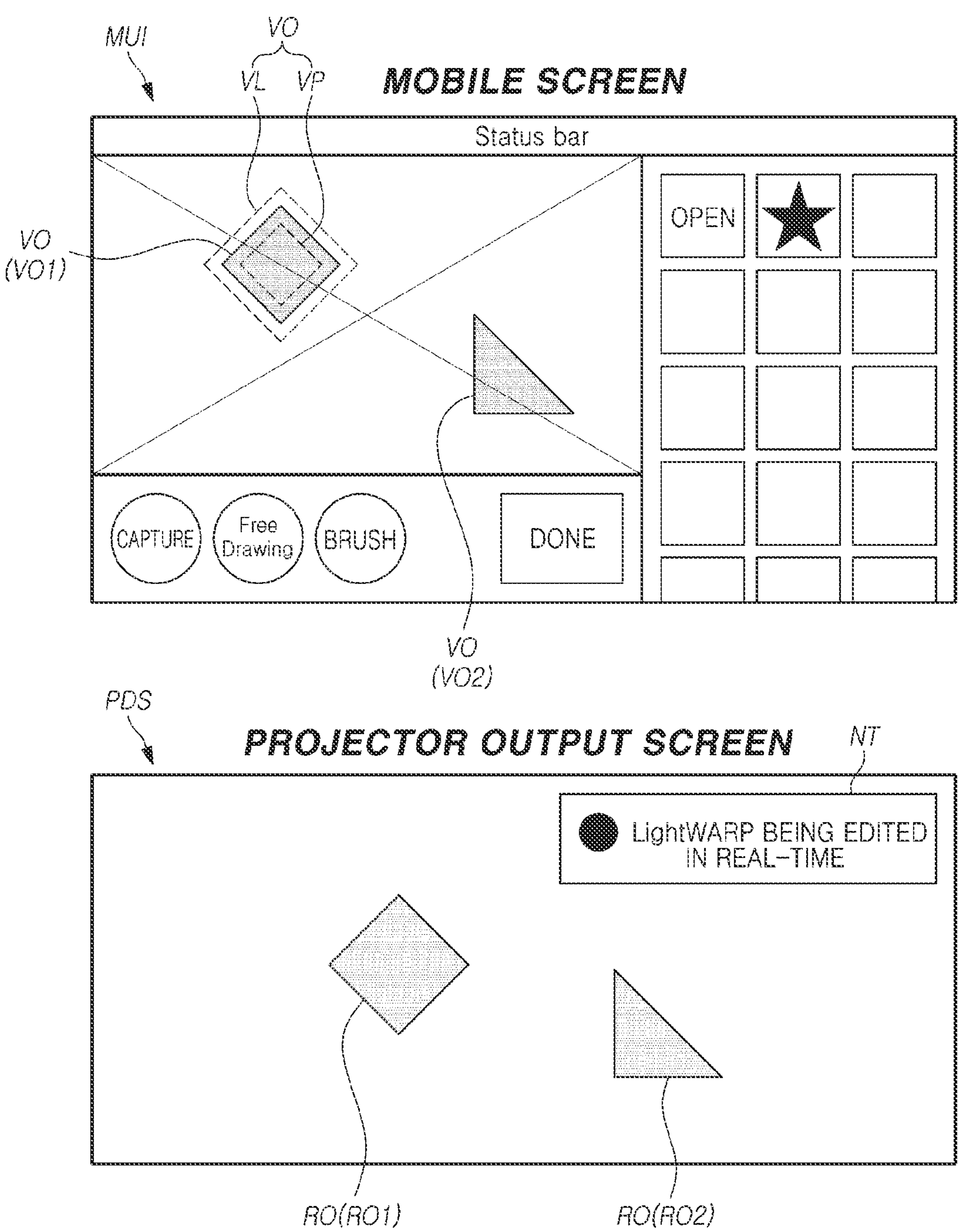

Referring to FIG. 14, the user equipment may display the image corresponding to the edit area of the sub-user interface representation SUI in the drawing area DA. The image displayed in the drawing area DA may be a form in which a raster image and a vector image overlap each other.

For example, based on receiving a user input to the second button B12 in the sub-user interface representation SUI, the user equipment may apply vectorization to the raster image corresponding to the edit area. The user equipment may obtain a vector image for the raster image corresponding to the edit area based on vectorization. The user equipment may superpose the raster image and the vector image and display them in the drawing area DA.

Vectorization is not limited to being performed in response to a user input to the second button B12 of the sub-user interface representation SUI. For example, vectorization may be performed based on obtaining the captured image CI. When vectorization is performed based on obtaining the captured image CI, the captured image CI illustrated in FIGS. 12 and 13 may be displayed to overlap the vector image vectorized from the captured image CI.

The vector image may include vector objects VO (e.g., including a first vector object VO1 and a second vector object VO2). The vector object VO may correspond to the captured object CO and/or the real object RO. The vector object VO may include a vector line VL and/or a vector plane VP. Each of the vector line VL and/or the vector plane VP may be processed as a content mapping area.

Figure 15:
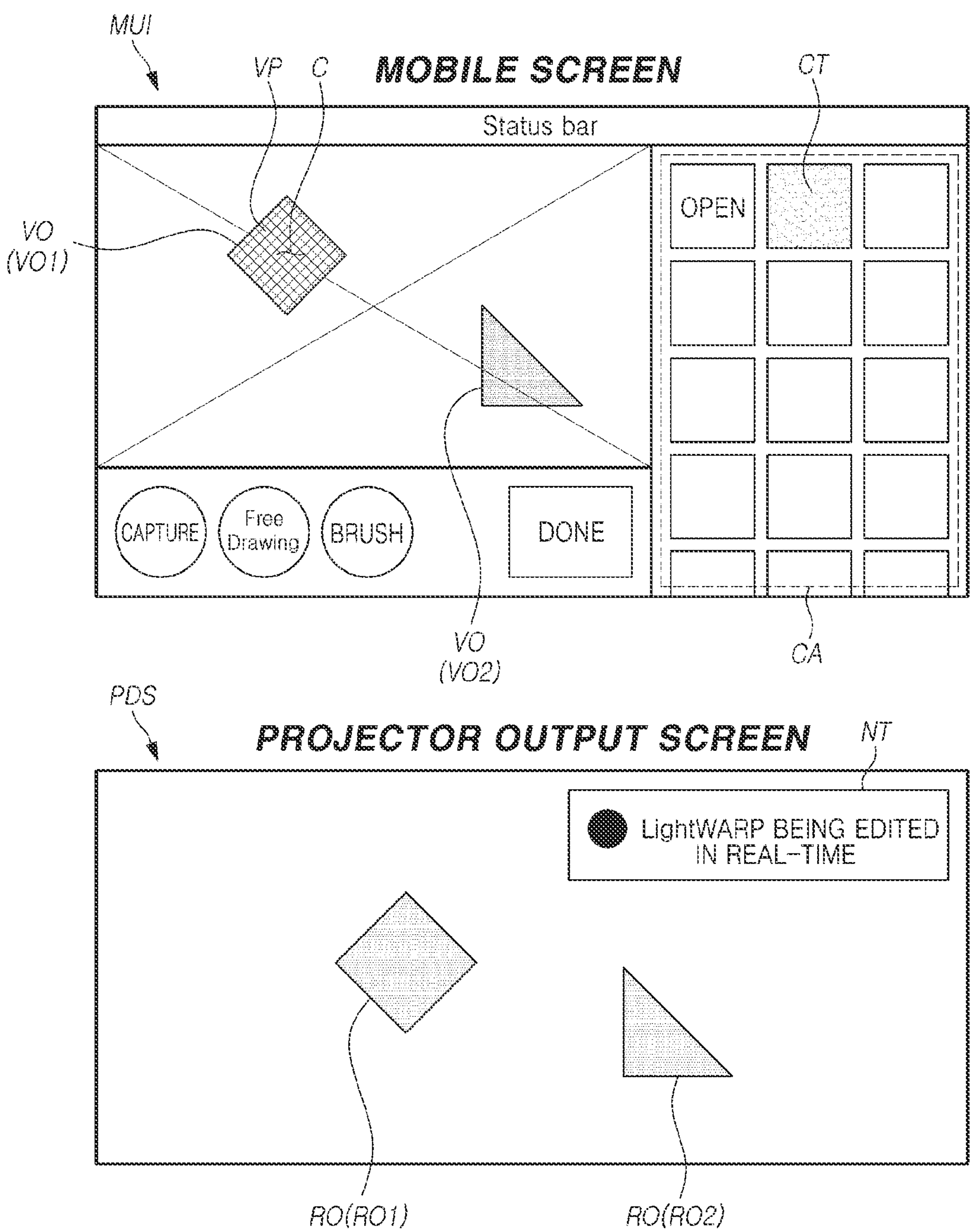

Referring to FIG. 15, in response to receiving a user input (e.g., a focusing input) to the content mapping area, the selected content mapping area is switched to a focusing state. While the focusing state is maintained, in response to receiving a selection input to the content option CT, the user equipment may allocate the content associated with the content option CT where the selection input is received to the content mapping area in the focusing state. Accordingly, content may be mapped to the focused content mapping area.

While remaining in the focusing state, the content mapping area may be expressed as a focus pattern. The focus pattern may be expressed in a color and/or pattern different from the content mapping area other than the focusing state.

Figure 16:
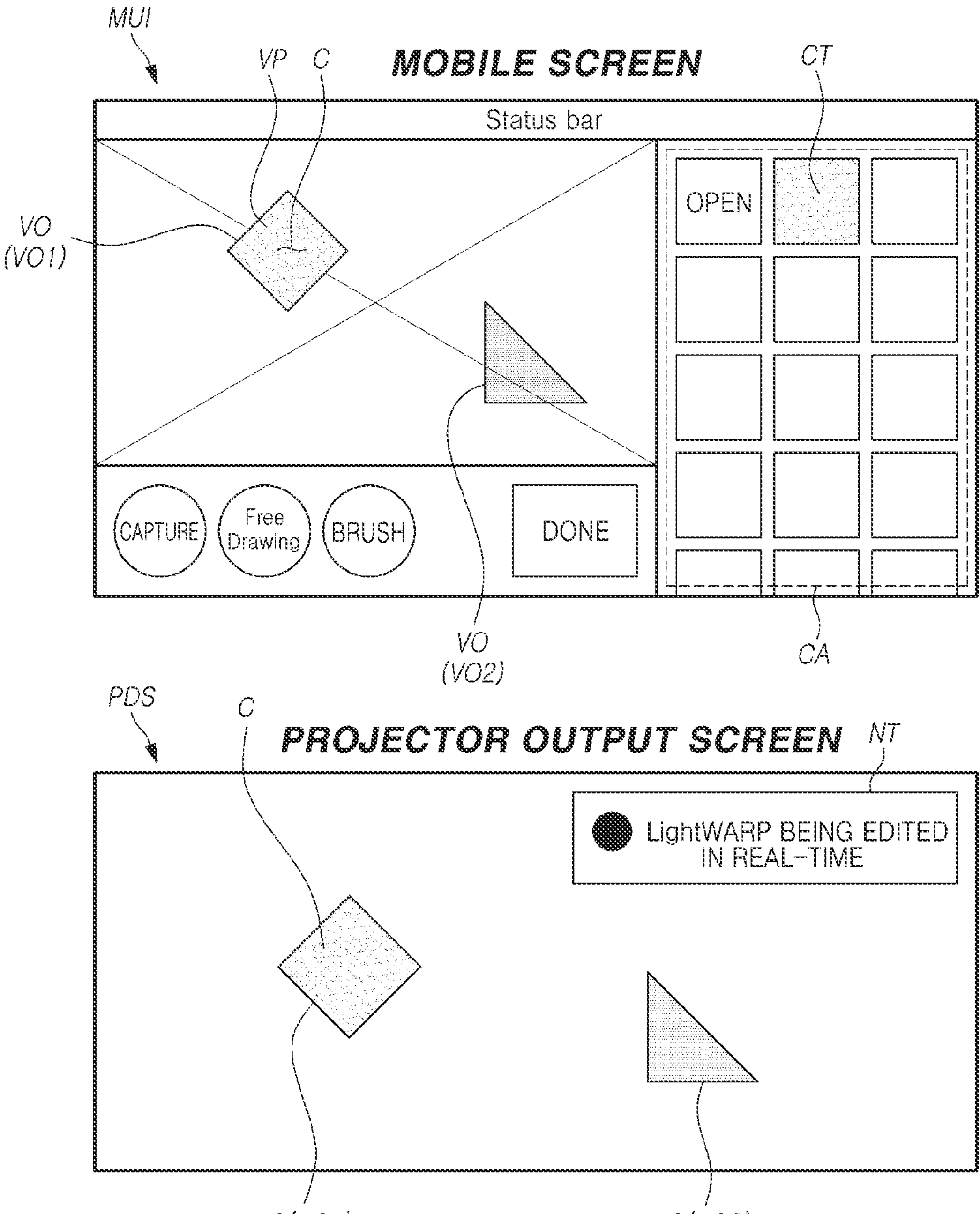

Referring to FIG. 16, content is mapped to the content mapping area by the user equipment. A content layer is generated in response to the content being mapped to the content mapping area. The content layer includes one content. In response to mapping the content to the content mapping area, a content layer where the content is mapped to the content mapping area is generated.

The user equipment generates a projection screen by superposing the generated content layer. For example, whenever a content layer is generated, the user equipment may generate a projection screen. For example, whenever a content layer is generated, the user equipment may generate a projection screen by superposing the previously generated content layer(s) and the newly generated content layer.

The user equipment transmits the projection screen to the projector. The user equipment transmits, e.g., the generated projection screen to the projector in response to generation of the projection screen. For example, whenever a content layer is generated, the user equipment may generate a projection screen by superposing the previously generated content layer(s) with the newly generated content layer, and may transmit the generated projection screen to the projector. The user equipment may transmit a new projection screen to the projector in response to, e.g., a new content layer being added to the new projection screen as compared with the previous projection screen or the previous content layer being edited (or deleted).

The projector may project the projection screen through the image projection unit. For example, whenever a new projection screen is received from the user equipment, the projector may project the new projection screen through the image projection unit. Accordingly, whenever a content layer is newly created, the projector may project a new projection screen through the image projection unit.

In an embodiment, the user equipment may share an image displayed through the drawing area DA with the projector. For example, the user equipment may transmit the image displayed through the drawing area DA to the projector at least in real time or continuously. Accordingly, as the image being displayed in the drawing area DA of the user equipment is edited, the projector may output a projection screen to which the editing is reflected.

The content layer where the projector forms the projection screen includes content in the content mapping area corresponding to the vector object VO. The vector object VO corresponds to the real object RO in position and/or shape. Accordingly, if the projection screen is output by the projector, the content included in the content layer may be expressed on the real object RO of the real environment.

For example, if the content is mapped to the first vector object VO1, a content layer in which the content is mapped to the position and/or shape of the first vector object VO1 is generated. The user equipment provides a projection screen including the generated content layer to the projector, and the projector outputs the projection screen. Since the first vector object VO1 has a position and/or shape corresponding to the first real object RO1 of the real environment, the content may be expressed on the first real object RO1.

Figure 17:
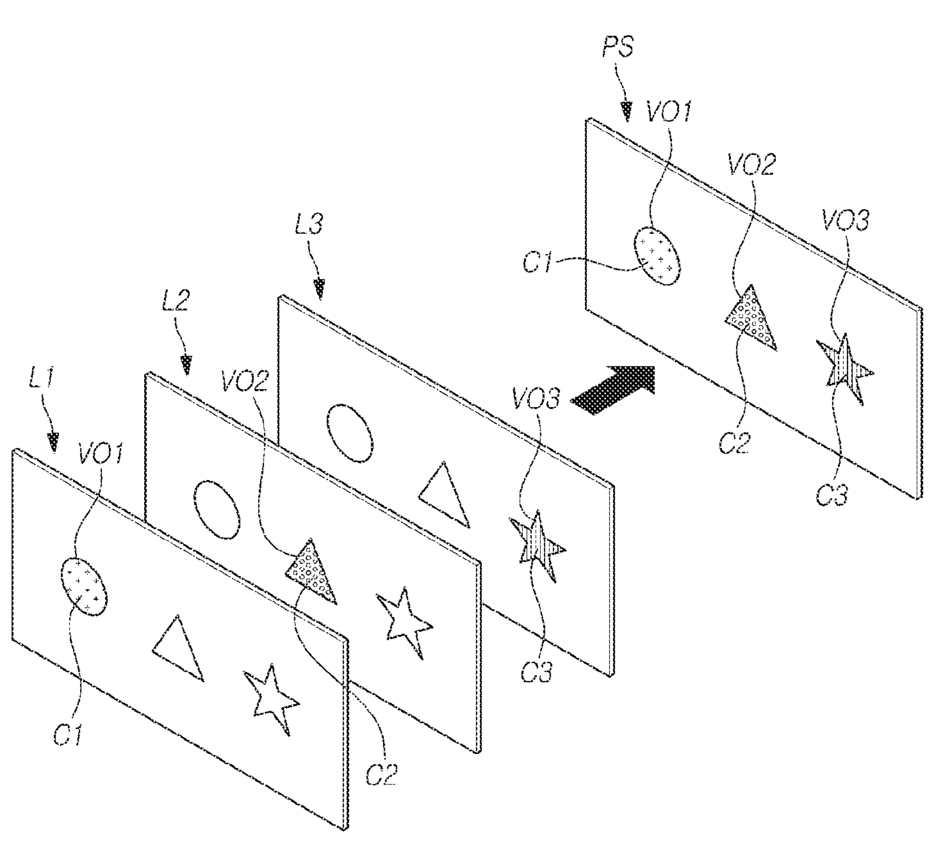
FIG. 17 is an exploded view illustrating a configuration of a projection screen according to various embodiments.
Figure 18:
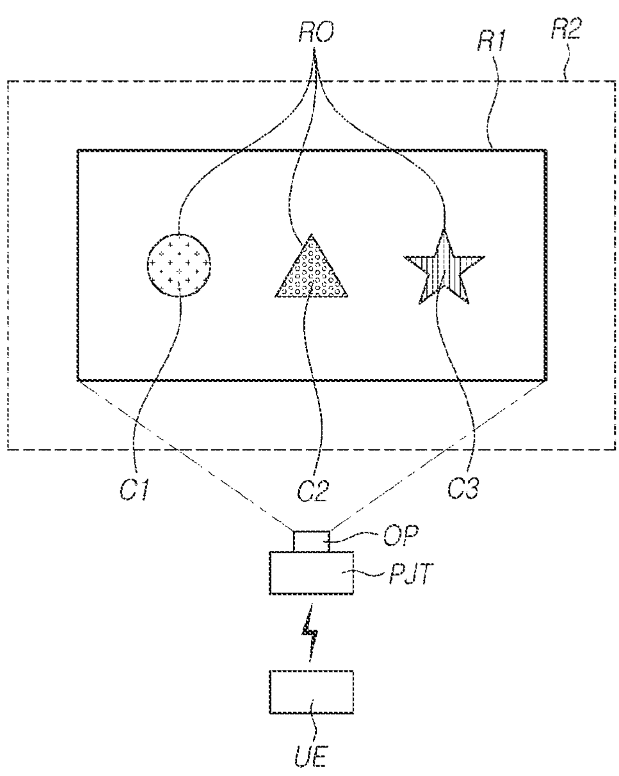
FIG. 18 is a diagram illustrating a result of projection of the projection screen of FIG. 17 according to various embodiments.

FIG. 17 is an exploded view illustrating an example configuration of a projection screen according to various embodiments. FIG. 18 is a diagram illustrating a result of projection of the projection screen of FIG. 17 according to various embodiments.

Referring to FIG. 17, the projection screen PS may include a plurality of content layers. The projection screen PS may be configured by superposing, e.g., a first content layer L1, a second content layer L2, and a third content layer L3.

The first content layer L1, the second content layer L2, and the third content layer L3 may include substantially the same or different contents. The content included in the first content layer L1, the second content layer L2, and the third content layer L3 may be configured by mapping the content to any one of the first vector object VO1, the second vector object VO2, and the third vector object VO3.

For example, the first content layer L1 may be configured by mapping the first content C1 to the first vector object VO1. The second content layer L2 may be configured by mapping the second content C2 to the second vector object VO2. The third content layer L3 may be configured by mapping the third content C3 to the third vector object VO3.

The projection screen PS may be configured by superposing a first content layer L1, a second content layer L2, and a third content layer L3. For example, the projection screen PS may be generated to represent the first content C1 in the content mapping area corresponding to the first vector object VO1, to represent the second content C2 in the content mapping area corresponding to the second vector object VO2, and to represent the third content C3 in the content mapping area corresponding to the third vector object VO3.

Referring to FIG. 18, the projector PJT projects the projection screen PS to the projection area R1 through the image projection unit OP. The projection screen PS is generated to correspond to the projection area R1, and the projection screen PS is not projected to the peripheral area R2. The real object RO positioned in the projection area R1 corresponds to the vector object (e.g., including the first vector object VO1, the second vector object VO2, and the third vector object VO3 of FIG. 17) that is the basis of the projection screen PS, and the content mapped to the corresponding vector object is represented in each real object RO.

The projection area R1 may be identified by the user equipment UE using a standby screen. The projection screen PS and the standby screen (e.g., the standby screen SBS of FIGS. 11 and 12) may be projected to have substantially the same or similar areas and positions. While the projector PJT projects the standby screen, the user equipment UE may obtain a captured image including the standby screen by photographing the projection area R1 where the standby screen is projected.

The user equipment UE may identify the standby screen included in the captured image using feature information (e.g., including at least one of brightness, marker, and/or stripe pattern). For example, the user equipment UE may identify markers included as at least part of the standby screen, and may identify the projection area R1 based on at least one of the position and/or the number of the identified markers. For example, the user equipment UE may identify the stripe pattern included as at least part of the standby screen, and may identify the projection area R1 based on the identification result of the stripe pattern. For example, the user equipment UE may identify the projection area R1 based on the brightness difference in the partial area of the captured image caused by the projection of the standby screen in white.

The above-described identification of the projection area R1 may be implemented not only in the user equipment UE but also in the projector PJT. For example, the projector PJT may include one or more cameras for generating a captured image, and may obtain the captured image using the camera. In this case, the projector PJT itself may identify the projection area R1 using the obtained captured image.

The projection screen PS may be provided from the user equipment UE or may be generated by the projector PJT.

Figure 19:
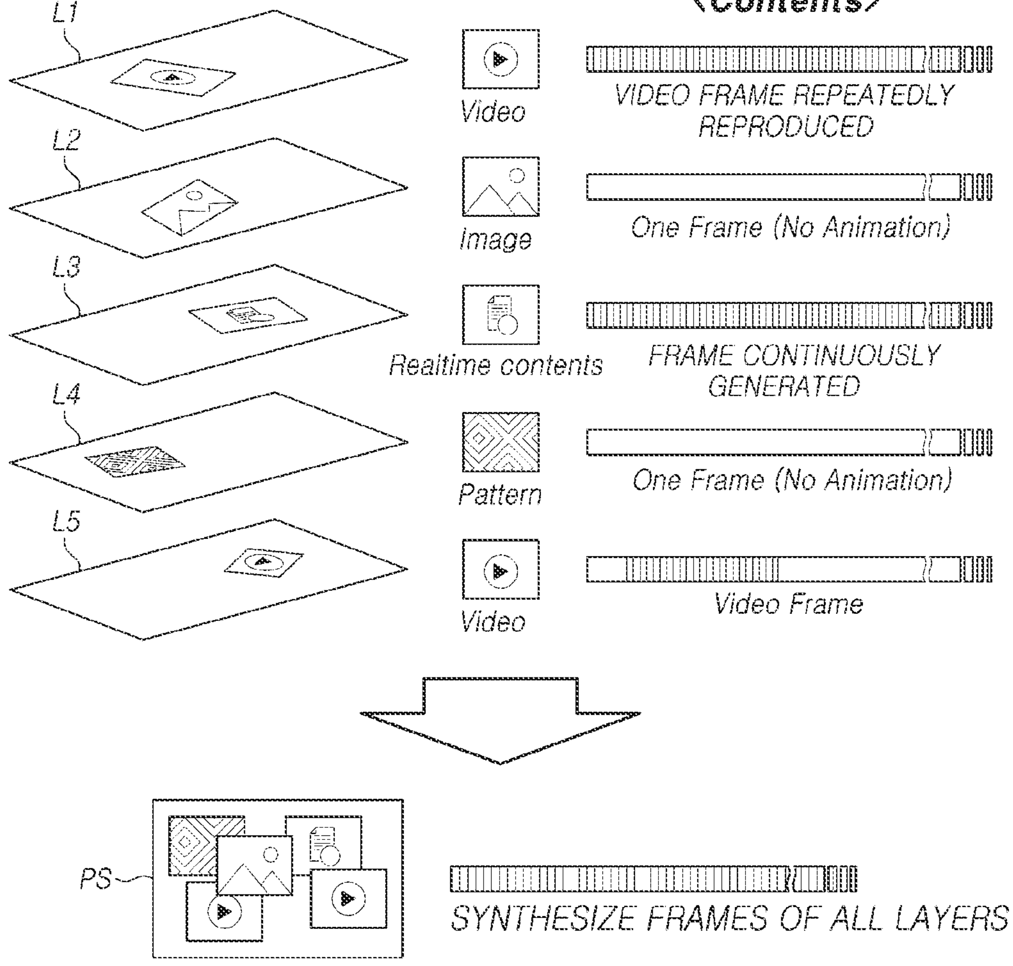
FIG. 19 is a diagram illustrating frame synthesis of a projection screen according to various embodiments.

FIG. 19 is a diagram illustrating frame synthesis of a projection screen according to various embodiments.

Referring to FIG. 19, a projection screen PS may be generated by superposing a plurality of content layers (e.g., including a first content layer L1, a second content layer L2, a third content layer L3, a fourth content layer L4, and a fifth content layer L5).

The content mapped to each of the first content layer L1, the second content layer L2, the third content layer L3, the fourth content layer LA, and/or the fifth content layer L5 may be any one of various content types. The content type may include, e.g., a video, an image, real-time content, and a pattern, but is not limited thereto.

In an embodiment, the video may include an image frame that is repeatedly reproduced. The video may also include an image frame that is reproduced only for a certain period of time. The image may be include a single frame. The image including a single frame is a still image and cannot express the animation effect. The real-time content includes an image frame that is continuously generated. The pattern may be include one frame. The pattern may be included as a portion of the image.

The real-time content is a content that allows the user to receive feedback in real time, and includes an image frame newly generated while the user and the content interact with each other. The real-time content may include, e.g., real-time content such as a chat service, a sports broadcast, and live news on a streaming platform.

The projection screen PS may be generated by superposing (or synthesizing) a plurality of content layers. The projection screen PS may configure an entire frame by synthesizing frames of all content layers (e.g., the first content layer L1, the second content layer L2, the third content layer L3, the fourth content layer LA, and the fifth content layer L5).

As such, the entire frame of the projection screen PS may be set by synthesizing the respective frames of the content layers of the projection screen, and accordingly, while the entire frame of the projection screen is reproduced, each content layer may be individually reproduced based on each frame.

Figure 20:
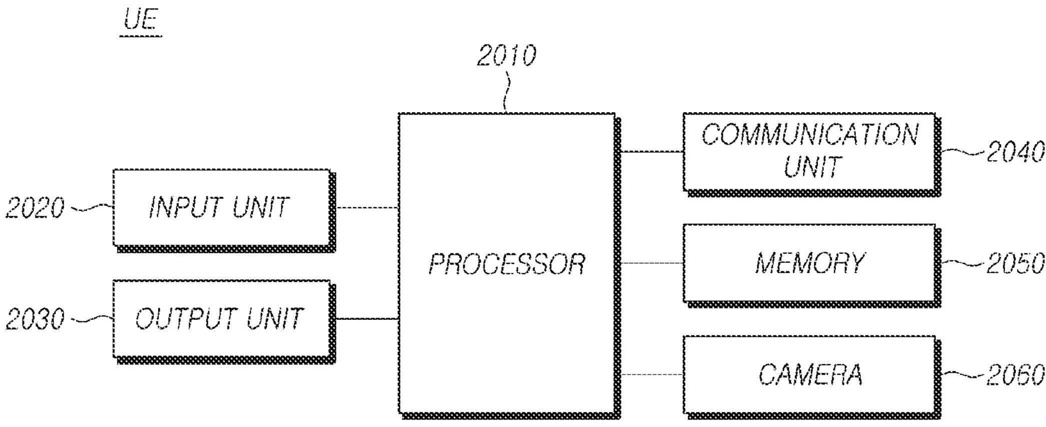
FIG. 20 is a block diagram illustrating an example configuration of a user equipment according to various embodiments.

FIG. 20 is a block diagram illustrating an example configuration of a user equipment according to various embodiments.

Referring to FIG. 20, a user equipment (UE) (user equipment (UE) of FIG. 1) according to an example may include at least one processor (e.g., including processing circuitry) 2010, an input unit (e.g., including input circuitry) 2020, an output unit (e.g., including output circuitry) 2030, a communication unit (or a transceiver) (e.g., including communication circuitry) 2040, a memory 2050, and/or a camera 2060. The output unit 2030 may include a display unit (e.g., including a display) corresponding to a component, such as a display for providing visual information to the user.

The processor 2010 may include various processing circuitry and/or multiple processors. For example, as used herein, including the claims, the term "processor" may include various processing circuitry, including at least one processor, wherein one or more of at least one processor, individually and/or collectively in a distributed manner, may be configured to perform various functions described herein. As used herein, when "a processor", "at least one processor", and "one or more processors" are described as being configured to perform numerous functions, these terms cover situations, for example and without limitation, in which one processor performs some of recited functions and another processor(s) performs other of recited functions, and also situations in which a single processor may perform all recited functions. Additionally, the at least one processor may include a combination of processors performing various of the recited/disclosed functions, e.g., in a distributed manner. At least one processor may execute program instructions to achieve or perform various functions. The processor 2010 may execute, e.g., software (e.g., a program) to control at least one other component (e.g., a hardware or software component) of the user equipment 120 connected with the processor 2010 and may process or compute various data. As at least part of the data processing or computation, the processor 2010 may store a command or data received from another component (e.g., the input unit 2020) in the memory 2050, process the command or the data stored in the memory 2050, and store resulting data in the memory 2050. The processor 2010 may include a main processor (e.g., a central processing unit (CPU) or an application processor (AP)), or an auxiliary processor (e.g., a graphics processing unit (GPU), a neural processing unit (NPU), an image signal processor (ISP), a sensor hub processor, or a communication processor (CP)) that is operable independently from, or in conjunction with, the main processor. For example, when the user equipment (UE) includes the main processor and the auxiliary processor, the auxiliary processor may be configured to use lower power than the main processor or to be specified for a designated function. The auxiliary processor may be implemented separately from, or as part of, the main processor.

The memory 2050 may store various data used by at least one component (e.g., the processor 2010) of the user equipment (UE). The various data may include, for example, software (e.g., the program) and input data or output data for a command related thereto. The memory 2050 may include a volatile memory or a non-volatile memory.

The input unit 2020 may include various circuitry and receive a command or data to be used by a component (e.g., the processor 2010) of the user equipment (UE), from the outside (e.g., a user) of the user equipment (UE). The input unit 2020 may include, for example, a microphone, a mouse, a keyboard, keys (e.g., buttons), or a digital pen (e.g., a stylus pen).

The output unit 2030 may include various circuitry and externally output visual or auditory information to be transferred to the user. The output unit 2030 may include, e.g., a speaker or receiver capable of outputting auditory information. The speaker may be used for general purposes, such as playing multimedia or playing record. The receiver may be used for receiving incoming calls. The receiver may be implemented as separate from, or as part of the speaker. The output unit 2030 may include a display unit. The display unit may include a display that outputs visual information to the outside. The display unit may include, for example, a display, a hologram device, or a projector and control circuitry to control a corresponding one of the display, hologram device, and projector. The display unit may include a touch sensor configured to detect a touch, or a pressure sensor configured to measure the intensity of a force generated by the touch.

The communication unit 2040 may include various communication circuitry and may be referred to as a transceiver. The communication unit 2040 may support establishing a direct (e.g., wired) communication channel or a wireless communication channel between the user equipment (UE) and an external electronic device (e.g., the service server 110 of FIG. 1) and performing communication via the established communication channel. The communication unit 2040 may include one or more communication processors that are operable independently from the processor 2010 (e.g., the application processor (AP)) and supports a direct (e.g., wired) communication or a wireless communication. The communication unit 2040 may include a wireless communication module (e.g., a cellular communication module, a short-range wireless communication module, or a global navigation satellite system (GNSS) communication module) or a wired communication module (e.g., a local area network (LAN) communication module or a power line communication module). A corresponding one of these communication modules may communicate with the external electronic device via a first network (e.g., a short-range communication network, such as Bluetooth™, wireless-fidelity (Wi-Fi) direct, or infrared data association (IrDA)) or a second network (e.g., a long-range communication network, such as a legacy cellular network, a 5G network, a next-generation communication network, the Internet, or a computer network (e.g., local area network (LAN) or wide area network (WAN)). These various types of communication modules may be implemented as a single component (e.g., a single chip), or may be implemented as multi components (e.g., multi chips) separate from each other.

The camera 2060 may obtain images of the user or the ambient environment, and the obtained images may be the basis for interactions, such as recognizing the user's movement or face or recognizing changes in the ambient environment. The camera 2060 may transfer the obtained image to another component, such as the processor 2010 or memory 2050. Methods or operations according to various embodiments of the disclosure may be implemented based on the image obtained by the camera 2060.

Figure 21:
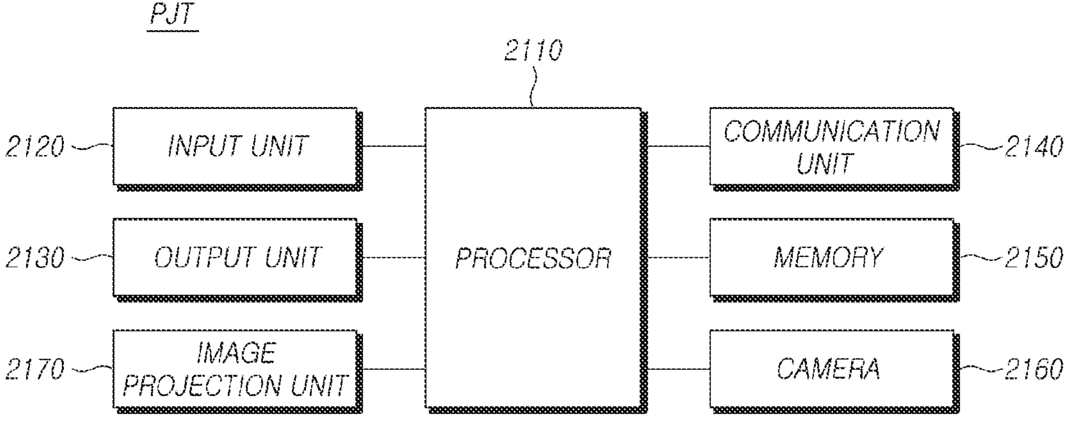
FIG. 21 is a block diagram illustrating an example configuration of a projector according to various embodiments.

FIG. 21 is a block diagram illustrating an example configuration of a projector according to various embodiments.

Referring to FIG. 21, a projector PJT (projector PJT of FIG. 1) according to an example may include at least one processor (e.g., including processing circuitry) 2110, an input unit (e.g., including input circuitry) 2120, an output unit (e.g., including output circuitry) 2130, a communication unit (e.g., including communication circuitry) 2140, a memory 2150, a camera 2160, and/or an image projection unit (e.g., including an image projector) 2170. The output unit 2130 may include a display unit (e.g., including a display) corresponding to a component, such as a display for providing visual information to the user.

The processor 2110 may include various processing circuitry and/or multiple processors. For example, as used herein, including the claims, the term "processor" may include various processing circuitry, including at least one processor, wherein one or more of at least one processor, individually and/or collectively in a distributed manner, may be configured to perform various functions described herein. As used herein, when "a processor", "at least one processor", and "one or more processors" are described as being configured to perform numerous functions, these terms cover situations, for example and without limitation, in which one processor performs some of recited functions and another processor(s) performs other of recited functions, and also situations in which a single processor may perform all recited functions. Additionally, the at least one processor may include a combination of processors performing various of the recited/disclosed functions, e.g., in a distributed manner. At least one processor may execute program instructions to achieve or perform various functions. The processor 2110 may execute, e.g., software (e.g., a program) to control at least one other component (e.g., a hardware or software component) of the user equipment 121 connected with the processor 2110 and may process or compute various data. As at least part of the data processing or computation, the processor 2110 may store a command or data received from another component (e.g., the input unit 2120) in the memory 2150, process the command or the data stored in the memory 2150, and store resulting data in the memory 2150. The processor 2110 may include a main processor (e.g., a central processing unit (CPU) or an application processor (AP)), or an auxiliary processor (e.g., a graphics processing unit (GPU), a neural processing unit (NPU), an image signal processor (ISP), a sensor hub processor, or a communication processor (CP)) that is operable independently from, or in conjunction with, the main processor. For example, when the projector PJT includes the main processor and the auxiliary processor, the auxiliary processor may be configured to use lower power than the main processor or to be specified for a designated function. The auxiliary processor may be implemented separately from, or as part of, the main processor.

The memory 2150 may store various data used by at least one component (e.g., the processor 2110) of the projector PJT. The various data may include, for example, software (e.g., the program) and input data or output data for a command related thereto. The memory 2150 may include a volatile memory or a non-volatile memory.

The input unit 2120 may include various circuitry and receive a command or data to be used by a component (e.g., the processor 2110) of the projector PJT, from the outside (e.g., a user) of the projector PJT. The input unit 2120 may include, for example, a microphone, a mouse, a keyboard, keys (e.g., buttons), or a digital pen (e.g., a stylus pen).

The output unit 2130 may include various circuitry and externally output visual or auditory information to be transferred to the user. The output unit 2130 may include, e.g., a speaker or receiver capable of outputting auditory information. The speaker may be used for general purposes, such as playing multimedia or playing record. The receiver may be used for receiving incoming calls. The receiver may be implemented as separate from, or as part of the speaker. The output unit 2130 may include a display unit. The display unit may include a display that outputs visual information to the outside. The display unit may include, for example, a display, a hologram device, or a projector and control circuitry to control a corresponding one of the display, hologram device, and projector. The display unit may include a touch sensor configured to detect a touch, or a pressure sensor configured to measure the intensity of a force generated by the touch.

The communication unit 2140 may include various communication circuitry and may be referred to as a transceiver. The communication unit 2140 may support establishing a direct (e.g., wired) communication channel or a wireless communication channel between the projector PJT and an external electronic device (e.g., the service server 110 of FIG. 1) and performing communication via the established communication channel. The communication unit 2140 may include one or more communication processors that are operable independently from the processor 2110 (e.g., the application processor (AP)) and supports a direct (e.g., wired) communication or a wireless communication. The communication unit 2140 may include a wireless communication module (e.g., a cellular communication module, a short-range wireless communication module, or a global navigation satellite system (GNSS) communication module) or a wired communication module (e.g., a local area network (LAN) communication module or a power line communication module). A corresponding one of these communication modules may communicate with the external electronic device via a first network (e.g., a short-range communication network, such as Bluetooth™, wireless-fidelity (Wi-Fi) direct, or infrared data association (IrDA)) or a second network (e.g., a long-range communication network, such as a legacy cellular network, a 5G network, a next-generation communication network, the Internet, or a computer network (e.g., local area network (LAN) or wide area network (WAN)). These various types of communication modules may be implemented as a single component (e.g., a single chip), or may be implemented as multi components (e.g., multi chips) separate from each other.

The camera 2160 may obtain images of the user or the ambient environment, and the obtained images may be the basis for interactions, such as recognizing the user's movement or face or recognizing changes in the ambient environment. The camera 2160 may transfer the obtained image to another component, such as the processor 2110 or memory 2150. Methods or operations according to various embodiments of the disclosure may be implemented based on the image obtained by the camera 2160.

The image projection unit 2170 may include a projector including, for example, a light source lamp and a lens. The light source lamp may mean an element that outputs light. The light output from the light source lamp may be projected onto the screen (or wall) through the lens. The image projection unit 2170 may project the image provided from the processor 2110 onto the front screen or wall, and the user may view the projected image.

The electronic device according to various embodiments may be one of various types of electronic devices. The electronic devices may include, for example, a display device, a portable communication device (e.g., a smartphone), a computer device, a portable multimedia device, a portable medical device, a camera, a wearable device, a home appliance, or the like. The electronic devices according to an embodiment are not limited to those described above.

It should be appreciated that various embodiments of the disclosure and the terms used therein are not intended to limit the technological features set forth herein to particular embodiments and include various changes, equivalents, or replacements for a corresponding embodiment. As used herein, the singular forms "a," "an," and "the" are intended to include the plural forms as well, unless the context clearly indicates otherwise. As used herein, the term 'and/or' should be understood as encompassing any and all possible combinations by one or more of the enumerated items. As used herein, the terms "include," "have," and "comprise" are used merely to designate the presence of the feature, component, part, or a combination thereof described herein, but use of the term does not exclude the likelihood of presence or adding one or more other features, components, parts, or combinations thereof. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order).

As used herein, the term "part" or "module" may include a unit implemented in hardware, software, or firmware, or any combination thereof, and may interchangeably be used with other terms, for example, "logic," "logic block," "part," or "circuitry". A part or module may be a single integral component, or a minimum unit or part thereof, adapted to perform one or more functions. For example, according to an embodiment, 'part' or 'module' may be implemented in a form of an application-specific integrated circuit (ASIC).

As used in various embodiments of the disclosure, the term "if" may be interpreted as "when," "upon," "in response to determining," or "in response to detecting," depending on the context. Similarly, "if A is determined" or "if A is detected" may be interpreted as "upon determining A" or "in response to determining A", or "upon detecting A" or "in response to detecting A", depending on the context.

The program executed by the electronic device described herein may be implemented as a hardware component, a software component, and/or a combination thereof. The program may be executed by any system capable of executing computer readable instructions.

The software may include computer programs, codes, instructions, or combinations of one or more thereof and may configure the processing device as it is operated as desired or may instruct the processing device independently or collectively. The software may be implemented as a computer program including instructions stored in computer-readable storage media. The computer-readable storage media may include, e.g., magnetic storage media (e.g., read-only memory (ROM), random-access memory (RAM), floppy disk, hard disk, etc.) and an optically readable media (e.g., CD-ROM or digital versatile disc (DVD). Further, the computer-readable storage media may be distributed to computer systems connected via a network, and computer-readable codes may be stored and executed in a distributed manner. The computer program may be distributed (e.g., downloaded or uploaded) via an application store (e.g., Play Store™), directly between two UEs (e.g., smartphones), or online. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. Some of the plurality of entities may be separately disposed in different components. According to various embodiments, one or more of the above-described components may be omitted, or one or more other components may be added.

Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by those skilled in the art that various changes in form and detail may be made without departing from full scope of the disclosure, including the appended claims and their equivalents. It will also be understood that any of the embodiment(s) described herein may be used in conjunction with any other embodiment(s) described herein.

What is claimed is:

1. An electronic device, comprising:

a display;

a transceiver;

one or more memories; and at least one processor, comprising processing circuitry, electrically connected to the display, the transceiver and the one or more memories, wherein the at least one processor, individually or collectively is configured to:

obtain, using at least one camera, a captured image including one or more captured objects corresponding respectively to one or more real objects;

identify a projection area included as at least part of the captured image based on feature information included in the captured image, wherein the feature information indicates that the projection area is where a standby screen is projected;

obtain a raster image corresponding to the projection area from the captured image, wherein the raster image includes the one or more captured objects where the standby screen is projected;

generate a vector image including one or more vector objects corresponding respectively to the one or more captured objects by vectorizing the raster image;

generate an edit screen by superposing the vector image and the raster image;

control the display to display a user interface representation including the edit screen;

process the one or more vector objects as one or more content mapping areas;

determine one or more contents mapped respectively to the one or more content mapping areas through the user interface representation;

generate one or more content lavers corresponding respectively to the one or more content mapping areas in response to at least one input to the user interface representation, wherein the one or more content mapping layers include the one or more contents respectively;

generate a projection screen including the one or more content layers by superposing the one or more content layers; and control the transceiver to transmit the projection screen to an external electronic device connected to the electronic device.

2. The electronic device of claim 1, wherein the at least one processor is configured to:

receive a focusing input to a content mapping area among the one or more content mapping areas, wherein the content mapping area is switched to a focusing state; and receive a selection input to a corresponding content among the one or more contents while the content mapping area is in the focusing state, wherein the corresponding content is mapped to the content mapping area.

3. The electronic device of claim 1, wherein the one or more vector objects include one or more vector lines or one or more vector planes.

4. The electronic device of claim 1, wherein the feature information includes at least one of a brightness difference, a visible marker, a non-visible marker or a stripe pattern.

5. The electronic device of claim 1, wherein the user interface representation includes a drawing area and a content selection area, and wherein the edit screen is displayed in the drawing area, and a plurality of content options mappable to a content mapping area are displayed in the content selection area.

6. The electronic device of claim 5, wherein the at least one processor, individually or collectively, is configured to generate a content layer where content associated with at least one of the plurality of content options is mapped to the content mapping area in response to receiving an input for mapping the content to the content mapping area.

7. The electronic device of claim 6, wherein the at least one processor, individually or collectively, is configured to generate the content layer whenever receiving the input for mapping the content associated with at least one of the plurality of content options to the content mapping area.

8. The electronic device of claim 6, wherein the at least one processor, individually or collectively, is configured to:

generate a new projection screen by adding the generated content layer to a pre-generated projection screen; and control the transceiver to transmit the new projection screen to the external electronic device in response to the generation of the new projection screen.

9. The electronic device of claim 1, wherein the at least one processor, individually or collectively, is configured to control the transceiver to transmit a message for controlling the external electronic device to output the standby screen.

10. The electronic device of claim 9, wherein the standby screen comprises a stripe-pattern screen.

11. The electronic device of claim 10, wherein the at least one processor, individually or collectively, is configured to:

obtain three-dimensional (3D) depth information based on a stripe pattern represented in the captured image;

detect a 3D vector object based on the 3D depth information; and process the 3D vector object as a content mapping area.

12. The electronic device of claim 1, wherein an entire frame of the projection screen is configured by synthesizing respective frames of one or more content layers of the projection screen, and wherein the entire frame of the projection screen is reproduced based on the respective frames of the one or more content layers.

13. An electronic device, comprising:

a display;

one or more image projectors;

one or more memories; and at least one processor, comprising processing circuitry, electrically connected to the display, the one or more image projectors and the one or more memories, wherein at least one processor, individually or collectively, is configured to:

obtain, using at least one camera, a captured image including one or more captured objects corresponding respectively to one or more real objects;

identify a projection area included as at least part of the captured image based on feature information included in the captured image, wherein the feature information indicates that the projection area is where a standby screen is projected;

obtain a raster image corresponding to the projection area from the captured image, wherein the raster image includes the one or more captured objects where the standby screen is projected;

generate a vector image including one or more vector objects corresponding respectively to the one or more captured objects by vectorizing the raster image;

generate an edit screen by superposing the vector image and the raster image;

control the display to display a user interface representation including the edit screen;

process the one or more vector objects as one or more content mapping areas;

determine one or more contents mapped respectively to the one or more content mapping areas through the user interface representation;

generate one or more content layers corresponding respectively to the one or more content mapping areas in response to at least one input to the user interface representation, wherein the one or more content mapping layers include the one or more contents respectively;

generate a projection screen including the one or more content layers by superposing the one or more content layers; and project the projection screen through the one or more image projectors.

14. An image mapping method performed by an electronic device, comprising:

obtaining, using at least one camera, a captured image including one or more captured objects corresponding respectively to one or more real objects;

identifying a projection area included as at least part of the captured image based on feature information included in the captured image, wherein the feature information indicates that the projection area is where a standby screen is projected;

obtaining a raster image corresponding to the projection area from the captured image, wherein the raster image includes the one or more captured objects where the standby screen is projected;

generating a vector image including one or more vector objects corresponding respectively to the one or more captured objects by vectorizing the raster image;

generating an edit screen by superposing the vector image and the raster image;

displaying a user interface representation including the edit screen on a display;

processing the one or more vector objects as one or more content mapping areas;

determining one or more contents mapped respectively to the one or more content mapping areas through the user interface representation;

generating one or more content lavers corresponding respectively to the one or more content mapping areas in response to at least one input to the user interface representation, wherein the one or more content mapping lavers include the one or more contents respectively;

generating a projection screen including the one or more content layers by superposing the one or more content layers; and transmitting the projection screen to an external electronic device connected to the electronic device.

15. The image mapping method of claim 14, wherein the determining of the one or more contents comprises:

receiving a focusing input to a content mapping area among the one or more content mapping areas, wherein the content mapping area is switched to a focusing state; and receiving a selection input to a corresponding content among the one or more contents while the content mapping area is in the focusing state, wherein the corresponding content is mapped to the content mapping area.

16. The image mapping method of claim 15, wherein the one or more vector objects include one or more vector lines or one or more vector planes.

17. The image mapping method of claim 15, wherein the feature information includes at least one of a brightness difference, a visible marker, a non-visible marker or a stripe pattern.

18. The image mapping method of claim 14, wherein the user interface representation includes a drawing area and a content selection area, and wherein the edit screen is displayed in the drawing area, and content options mappable to a content mapping area are displayed in the content selection area.

* * * * *